United States Patent
Nagelsdiek et al.

(10) Patent No.: US 11,453,750 B2
(45) Date of Patent: Sep. 27, 2022

(54) UREA-GROUP- AND/OR URETHANE-GROUP-CONTAINING AMIDES AS AND IN RHEOLOGY CONTROL AGENTS, THEIR PREPARATION AND THEIR USE

(71) Applicant: BYK-CHEMIE GMBH, Wesel (DE)

(72) Inventors: René Nagelsdiek, Wesel (DE); Sylvia Bühne, Wesel (DE); Silke Gaul, Wesel (DE); Berthold Jacobs, Wesel (DE); Verena Karwath, Wesel (DE); Dominika Bernert, Wesel (DE); Daniela Leutfeld, Wesel (DE)

(73) Assignee: BYK-Chemie GmbH, Wesel (DE)

(*) Notice: Subject to any disclaimer, the term of this patent is extended or adjusted under 35 U.S.C. 154(b) by 373 days.

(21) Appl. No.: 16/481,968

(22) PCT Filed: Jan. 28, 2018

(86) PCT No.: PCT/EP2018/051908
§ 371 (c)(1),
(2) Date: Jul. 30, 2019

(87) PCT Pub. No.: WO2018/138236
PCT Pub. Date: Aug. 2, 2018

(65) Prior Publication Data
US 2019/0390011 A1    Dec. 26, 2019

(30) Foreign Application Priority Data

Jan. 30, 2017 (EP) .................................. 17153779

(51) Int. Cl.
*C08G 69/48* (2006.01)
*C09D 7/65* (2018.01)

(52) U.S. Cl.
CPC ............ *C08G 69/48* (2013.01); *C09D 7/65* (2018.01)

(58) Field of Classification Search
CPC .................................................. C08G 69/48
See application file for complete search history.

(56) References Cited

U.S. PATENT DOCUMENTS

| | | | |
|---|---|---|---|
| 2,995,531 A | 8/1961 | Hudson | |
| 7,652,166 B2 | 1/2010 | Haubennestel et al. | |
| 7,655,815 B2 | 2/2010 | Haubennestel et al. | |
| 7,834,126 B2 * | 11/2010 | Haubennestel | C07C 233/38 528/271 |
| 8,809,429 B2 | 8/2014 | Azeyanagi et al. | |
| 10,253,133 B2 * | 4/2019 | Gobelt | C08G 18/2835 |
| 2007/0088148 A1 | 4/2007 | Haubennestel et al. | |
| 2007/0225451 A1 | 9/2007 | Haubennestel et al. | |

FOREIGN PATENT DOCUMENTS

| | | |
|---|---|---|
| CA | 2352660 C | 10/2008 |
| DE | 1100849 B | 3/1961 |
| DE | 102005015966 A1 | 10/2006 |
| DE | 102005049301 B3 | 4/2007 |
| DE | 102006010721 A1 | 9/2007 |
| EP | 0877063 A2 | 11/1998 |
| EP | 1188779 A1 | 3/2002 |
| JP | H11012529 A | 1/1999 |
| JP | 2005171155 A | 6/2005 |
| JP | 2007107002 A | 4/2007 |
| JP | 2007254742 A | 10/2007 |
| JP | 3160061 U | 6/2010 |
| WO | 2011052707 A1 | 5/2011 |
| WO | WO-2016193473 A1 * | 12/2016 ......... C08G 18/3278 |

OTHER PUBLICATIONS

International Search Report and Written Opinion for International Application No. PCT/EP2018/051908 dated Apr. 30, 2018.

* cited by examiner

*Primary Examiner* — Michael F Pepitone
(74) *Attorney, Agent, or Firm* — Fitch, Even, Tabin & Flannery LLP

(57) ABSTRACT

The invention relates to urea- and/or urethane-substituted amides of the general formula (I)

(I)

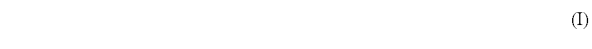

The radicals R1, Z1, R2, and Z2 comprise a building block containing urea groups and/or containing urethane groups; the radicals R4, Z4, R5, and Z5 comprise a building block containing amide groups, and E is a carboxylic acid group or salt thereof. The invention also relates to rheology control agents which consist of or comprise the amides of the formula (I). A further subject of the invention is a method for producing the rheology control agents, and the use of the urea- and/or urethane-substituted amides, and also of the rheology control agents, as thickeners, especially in liquid compositions, and also the liquid compositions themselves.

15 Claims, No Drawings

UREA-GROUP- AND/OR URETHANE-GROUP-CONTAINING AMIDES AS AND IN RHEOLOGY CONTROL AGENTS, THEIR PREPARATION AND THEIR USE

CROSS-REFERENCE TO RELATED APPLICATIONS

The present application is a national stage application under 35 U.S.C. § 371 of International Application No. PCT/EP2018/051908 filed Jan. 28, 2018, which claims priority of European Patent Application No. 17153779.8 filed on Jan. 30, 2017.

Aqueous formulations play a significant part in a host of different applications. A critical part in this are the rheological properties of these aqueous formulations. These rheological properties are controlled in general by means of rheology control agents, also referred to herein as rheology additives.

Rheology control agents are suitable fundamentally for raising the viscosity of various preparations and for optimizing the flow characteristics of the preparations for the particular application. Other objectives are to improve the storage stability and the workability of such preparations—coating materials, for example—and also to achieve relatively high film thicknesses when such coating materials are applied to substrates.

In the sector of paints and varnishes, for example, there is a significant trend in favor of water-based coatings, the latter being more eco-friendly and less objectionable from a health standpoint than solvent-containing systems. Relative to solvent-containing systems, however, aqueous systems are generally characterized by much slower drying rates, with consequences for the final coating properties. The settling of solids in the formulation (pigments or fillers, for example) must be prevented; the sagging of applied coatings is likewise undesirable. Suitable rheology control agents have a significant part in this context.

Where coating formulations, especially aqueous coating formulations, include what are called effect pigments, a part is played by the orientation of these pigments, with possible consequences for properties such as gloss, brilliance, and flop behavior (i.e., alteration in the coloristic properties of a material depending on the angle from which it is viewed). Examples of such effect pigments are metal effect pigments, such as aluminum pigments, brass pigments, gold-bronzes, oxidized bronzes, or iron oxide-aluminum pigments, for example. Likewise included among the effect pigments, for example, are interference pigments or pearlescent pigments such as metal oxide-mica pigments, pearl essence, bismuth oxychloride, or basic lead carbonate, for example.

In aqueous coating systems in particular there are distinct differences relative to solvent-containing systems; because of the slower evaporation of the water, there is no rapid horizontal fixing of the effect pigments. Nevertheless, this effect is also known for nonaqueous formulations. In addition to sufficient deflocculation, however, a horizontal alignment of the pigments with respect to the substrate is vital for a good flop, interference and/or metallic effect. For this it is necessary to use rheology control agents. Generally speaking, the assumption is that these agents in the ideal case develop their effect through establishment of a suitable minimum viscosity, of a pseudoplastic flow behavior, and also of corresponding elastic components; critical significance here attaches not only to the actual orientation of pigments but also to a uniform film thickness and to the distribution of the pigments in the matrix.

To thicken liquid formulations, especially aqueous formulations, additives of various kinds are used. Rheology assistants used include, for example, clay minerals, silicas, specific polyamides, or polysaccharide-based thickeners. A drawback of using these rheological assistants is that they are usually present in the form of dry solids. Consequently, said rheological assistants, before being deployed, are first integrated to form an intermediate product, using shearing forces. This, however, is often undesirable, since it entails additional cost and complexity. Moreover, operating with dry, pulverulent products, which may give rise to dusts during working, is undesirable.

US 2012/125235 describes combinations of specific polyamides with amide waxes and/or hydrogenated castor oil. Such combinations, on account of their consistency, are to start with usually difficult to manage and to incorporate (particularly into aqueous media), and it is also known that rheology additives based on hydrogenated castor oil, for example, exhibit a high degree of temperature-incompatibility, meaning that when certain temperatures are exceeded, the additives become ineffective and/or lead to disruptions in the coating film.

EP 0 877 063 describes the use of specific neutralized polyamides, which as an aqueous dispersion are presently employed as antisettling agents. With these products as well, the performance properties are often not sufficient, in relation, for example, to ease of incorporation or quality of the pigment orientation achieved. Such additives, for example, can often only be used in the form of low-concentration intermediate products, with corresponding cost and complexity.

Antisettling agents in the form of acidic polyamides are described for example in JP 2005 171 155 A and in WO 2011/052707 A1.

Disclosed in EP 1 188 779 A1 are urea-urethane solutions having rheological activity. These solutions often permit a strongly thixotropic behavior, but frequently display limitations in terms of pigment orientation.

DE 10 2006 010 721 A1, DE 10 2005 015 966 A1, and DE 10 2005 049 301 B3 describe urethane- and/or urea-containing amides having apolar hydrophobic end groups.

A further liquid application alternative is represented by acrylate thickeners. These thickeners are present in a liquid form, but their effect is heavily pH-dependent, and so they cannot be used in acidic media. One alternative is represented by associative thickeners (polyurethane thickeners, for example) which act by an associative route by way of hydrophobic interactions. Their behavior, however, is highly system-specific, and is often impaired by other components of the system (for example, cosolvents or wetting and dispersing additives), and in many cases does not have the desired properties, in relation to elasticity, for example.

The object of the present invention, accordingly, was especially that of providing an improved, highly effective rheology control agent of correspondingly high quality, having properties improved in particular in respect of the antisedimentation effect and the pH-independence of the effect.

Where the preparations of the invention, preferably aqueous preparations, are coating materials, they ought to have not only the aforementioned advantages relative to coating materials not additized in accordance with the invention, but also improved properties in relation to pigment orientation, particularly of leaflet-shaped effect pigments, and the prevention of thinning at the edges. A further intention was to improve the holdout of the preparations, relative to preparations equipped with conventional rheology control agents.

In the case of formulations with effect pigments, especially aqueous formulations, the additives of the invention additionally enable improved flop characteristics on the part of corresponding coatings. Further improvements are evident from the description hereinafter and the examples.

Above objects have surprisingly been achieved through the provision of urea- and/or urethane-substituted amides of the general formula (I) and, respectively, of a rheology control agent comprising or consisting of species of the general formula (I)

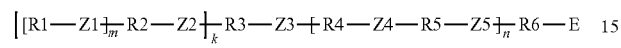
(I)

in which
the radicals R1 independently of one another are selected from the group consisting of
hydrogen, if m=1 and Z1 is a covalent bond, and
radicals $R^a$—[O—(C═O)$_u$R$^b$]$_v$, in which
$R^a$ is selected from the group consisting of
saturated or unsaturated, preferably saturated, linear or branched, preferably linear, aliphatic hydrocarbon radicals having 1 to 40, preferably 1 to 32, more preferably 1 to 24, and very preferably 1 to 18 or 1 to 13 carbon atoms;
aromatic hydrocarbon radicals having 6 to 40, preferably 6 to 32, more preferably 6 to 24, and very preferably 6 to 18 or 6 to 12 or 6 to 10 carbon atoms; and
araliphatic hydrocarbon radicals having 7 to 40, preferably 7 to 33, more preferably 7 to 25, and very preferably 7 to 19 or 7 to 13 carbon atoms;
u is 0 or 1,
v is 0 to 50, preferably 0 to 40, more preferably 0 to 25, very preferably 0 to 15,
the radicals $R^b$ independently of one another are divalent organic radicals which,
if u=0, are linear or branched alkylene radicals or arylalkylene radicals having 2 to 24, preferably 2 to 8, more preferably 2 to 4 carbon atoms, wherein, if an alkylene radical contains two carbon atoms, said radical may carry a substituent having the formula CH$_2$—O—(C═O)$_w$R$^c$, in which w is 0 or 1 and $R^c$ is an organic radical having 2 to 24, preferably 6 to 18, carbon atoms; and
if u=1, are linear or branched alkylene radicals having 3 to 8, preferably 4 to 6, carbon atoms; and
in the radicals [O—(C═O)$_u$R$^b$] the value for u in each radical independently is 0 or 1, wherein the radicals [O—(C═O)$_u$R$^b$] for which u=0 are preferably arranged in one or more blocks, and the radicals [O—(C═O)$_u$R$^b$] for which u=1 are preferably arranged in one or more blocks;
the radicals R2 independently of one another are divalent organic radicals which are selected from the group consisting of hydrocarbon radicals having 6 to 40, preferably 6 to 24, more preferably 6 to 13, very preferably 6 to 10 carbon atoms, which optionally contain one or more isocyanurate groups;
the radicals R3 independently of one another are (k+1)-valent organic radicals which are selected from the group consisting of
saturated or unsaturated, preferably saturated, linear or branched, aliphatic hydrocarbon radicals having 2 to 40, preferably 2 to 20, more preferably 2 to 8, and very preferably 2 to 4 carbon atoms, which optionally contain one or more ether oxygen atoms and/or carry one or more hydroxyl groups;
aromatic hydrocarbon radicals having 6 to 40, preferably 6 to 20, more preferably 6 to 12, and very preferably 6 to 10 carbon atoms, wherein the aromatic hydrocarbon radicals optionally carry one or more linear or branched alkyl substituents having 1 to 10, preferably 1 to 4, carbon atoms;
araliphatic hydrocarbon radicals having 8 to 40, preferably 8 to 20, more preferably 8 to 12, and very preferably 8 to 10 carbon atoms, wherein the aromatic hydrocarbon radicals optionally carry one or more linear or branched alkyl substituents having 1 to 10, preferably 1 to 4, carbon atoms, and are a radical N—R2-Z1-R1, if Z2 is an NH—(C═O) group, and wherein N in Z2 and Z3 is bonded to the respective carbon atom in NH—(C═O), and m=k=1,
the radicals R4 independently of one another are divalent organic radicals which are selected from the group consisting of
saturated or unsaturated, preferably saturated, linear or branched, preferably branched, aliphatic hydrocarbon radicals having 2 to 40, preferably 4 to 40, more preferably 4 to 38, and very preferably 30 to 38, more particularly 30 to 34, carbon atoms, wherein these are optionally substituted by one or more hydroxyl groups;
the radicals R5 independently of one another are divalent organic radicals which are selected from the group consisting of
saturated or unsaturated, preferably saturated, linear, branched or cyclic, preferably linear, aliphatic hydrocarbon radicals having 2 to 40, preferably 2 to 36, more preferably 2 to 13 or 3 to 13, and very preferably 2 to 8 or 4 to 8 carbon atoms, wherein the hydrocarbon radicals optionally contain ether oxygen atoms and/or tertiary amino groups;
araliphatic hydrocarbon radicals having 8 to 40, preferably 8 to 32, more preferably 8 to 24, and very preferably 8 to 18 or 8 to 16 or 8 to 12 carbon atoms;
aromatic hydrocarbon radicals having 6 to 40, preferably 6 to 32, more preferably 6 to 24, and very preferably 6 to 18 or 6 to 16 or 6 to 12 carbon atoms;
the radicals R6 are selected from the group of aromatic radicals having 6 to 40, preferably 6 to 32, more preferably 6 to 24, and very preferably 6 to 18 or 6 to 16 or 6 to 12 carbon atoms, or very preferably are defined like the radicals R4 and are selected independently of these;
the radicals E independently of one another are COOH or COO$^\ominus$Z$^\oplus$, very preferably are COOH, wherein Z$^\oplus$ is selected from the group consisting of alkali metal cations, NH$_4^\oplus$, heterocyclic cations, preferably imidazolium cations, tetrahydropyrimidinium cations, mono- to tetra-organically substituted ammonium ions whose organic substituents are preferably selected from the group of alkyl radicals having 1 to 24 carbon atoms, aryl radicals having 6 to 24 carbon atoms, alkylaryl radicals having 7 to 25 carbon atoms, wherein the alkyl radicals, aryl radicals, and alkylaryl radicals optionally carry one or more hydroxyl groups, and alkaline earth metal cations, preferably calcium and/or magnesium, or wherein Z$^\oplus$ is absent if Z5 is a protonated or quaternized amino group, and wherein, in the case of the alkaline earth metal cations, Z$^\oplus$ is ½ Z$^{2\oplus}$,
the radicals Z1 independently of one another are a urethane group, a urea group or a covalent bond, and preferably are —O—(C═O)—NH—;

the radicals Z2 independently of one another are a urethane group, or a urea group, preferably are —NH—(C=O)—O—, or, if R3 is a radical N—R2-Z1-R1, Z2 is an NH—(C=O) group;
the radicals Z3 are an amide group, preferably are —NH—(C=O)—;
the radicals Z4 are an amide group, preferably are —(C=O)—NH—;
the radicals Z5 independently of one another are an amide group, preferably —NH—(C=O)— or an amino group, wherein the amino group may also be in protonated or quaternized form and hence in the form of an ammonium group, and wherein in that case $Z^\oplus$ is absent;
m is 1 to 5, preferably 1 or 2, more preferably 1;
n is 1 to 12, preferably 1 to 6, more preferably 1 to 4 or 1 to 3, and very preferably 1 or 2;
k is 1 to 5, preferably 1 to 4, more preferably 1 to 3, more preferably still 1 or 2, and very preferably is 1.

For the individual species defined, the indices m, n, k, and v are—as is usual—integral. When looking at the entirety of the species, particularly in the case of species with molecular nonuniformity, in the case of relatively high values for v, for example, these indices represent numerical averages of the sum total of all the individual species.

Reference herein to hydrocarbon radicals means, in accordance with the usual definition, that the radicals are composed only of carbon and hydrogen. Where these radicals can optionally further include heteroatoms such as ether oxygen atoms, for example, hydroxyl groups or tertiary amino groups, that is stated explicitly. If a hydrocarbon radical may contain further carbon- and heteroatom-containing radicals, such as isocyanurates, for example, that too is stated explicitly. Where a hydrocarbon radical includes carbon- and heteroatom-containing radicals, then the carbon atoms containing in these radicals count toward the total number of carbon atoms in the hydrocarbon radical, because the carbon- and heteroatom-containing radical in an exceptional case of this kind is allowed as a constituent of the hydrocarbon radical, through the explicit naming.

With particular preference R1 is selected from the group consisting of
(i) linear or branched alkyl or alkenyl radicals having 6 to 24 carbon atoms and
(ii) polyether radicals of the formula $R^a$—$[O-R^b]_v$, in which $R^a$ is a linear or branched alkyl or alkenyl radical having 1 to 18 carbon atoms, $R^b$ is one or more radicals from the group consisting of $C_2H_4$, $C_3H_6$ and $C_4H_8$ and v is an integer from 1 to 25.

With very particular preference R1 is selected from the group consisting of
(i) linear or branched alkyl or alkenyl radicals having 8 to 18 carbon atoms and
(ii) polyether radicals of the formula $R^a$—$[O-R^b]_v$, in which $R^a$ is a linear or branched alkyl or alkenyl radical having 1 to 6 carbon atoms, $R^b$ is one or more radicals from the group consisting of $C_2H_4$ and $C_3H_6$ and v is an integer from 1 to 15.

With particular preference R2 is selected from the group consisting of

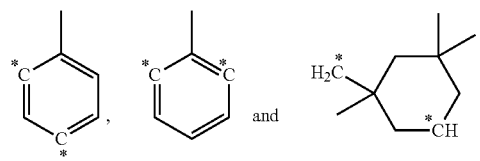

wherein m is 1, Z1 is —O—(C=O)—NH— and Z2 is —NH—(C=O)—O—, and the symbols "*" mark the bonding sites of the respective radical R2 to the radicals Z1 and Z2.

With particular preference R3 is selected from the group consisting of
(i) alkylene radicals having 2 to 6 carbon atoms, wherein k is an integer 1, and
(ii) alkylene radicals having 4 to 6 carbon atoms, which are preferably substituted by hydroxyl groups, wherein k is an integer 1, 2 or 3.

With particular preference R4 is selected from the group consisting of linear or branched alkylene or alkenylene radicals having 4 to 40 carbon atoms.

With very particular preference R4 is selected from the group consisting of branched alkylene or alkenylene radicals having 30 to 38 carbon atoms, wherein Z4 and Z5 are each an amide group.

With particular preference R5 is selected from the group consisting of linear or branched alkylene radicals having 2 to 13 carbon atoms, cycloalkylene radicals of 3 to 13 carbon atoms, and arylalkylene radicals having 7 to 13 carbon atoms.

With very particular preference R5 is selected from the group consisting of linear or branched alkylene radicals having 4 to 8 carbon atoms, cycloalkylene radicals of 4 to 8 carbon atoms, and arylalkylene radicals having 7 or 8 carbon atoms.

With particular preference R6 is selected from the abovementioned groups preferred for R4.

With particular preference Z3 is an amide group of the structure —NR8-(C=O)—, in which R8 is H, an alkyl radical having 1 to 12 carbon atoms, and an aryl radical having 6 to 12 carbon atoms or an alkylaryl radical having 7 to 12 carbon atoms, and more preferably is hydrogen. Less preferably, R8 herein is a radical —R3'[-Z2-R2-[Z1-R1]$_{m'}$]$_{k'}$, in which R3' is a (k'+1)-valent organic radical which is otherwise defined like radical R3, and R1, R2, Z1, and Z2 are defined as in formula (I), m' is defined like m, with the proviso that k=1 to 4, k'=1 to 4, and k+k'=2 to 5, and preferably k+k'=2 to 4, more preferably k+k'=2 or 3, and very preferably k+k'=2.

With particular preference E is a COOH group.

The number-average molecular weight of the species of the general formula (I) (determined by gel permeation chromatography as elucidated comprehensively in the experimental section of this specification) is preferably 1000 to 7500 g/mol, more preferably 1400 to 4000 g/mol, very preferably 1600 to 3800 g/mol, better still 2000 to 3000 g/mol.

Rheology Control Agents

The rheology control agents of the invention comprise or consist of one or more of the species of the general formula (I). The reaction products obtained by the process of the invention are referred to as rheology control agents of the invention. Ideally they consist of one or more of the species of the general formula (I). The rheology control agents of the invention are constituents of the rheology control agent compositions described later on below, said compositions in general comprising solvents, more particularly polar, aprotic solvents, and, optionally, ionogenic compounds such as, more particularly, salts. Both the rheology control agents and the rheology control agent compositions are generally in a form which is liquid at room temperature (25° C.). The rheology control agent compositions represent the customary storage forms and supply forms of the additives.

Process for Preparing the Rheology Control Agents of the Invention

In a preferred preparation process, the rheology control agent of the invention is prepared, as described below, through reaction of a building block (A) containing urea groups and/or urethane groups with a building block (B) containing amide groups. The definitions of the radicals and indices in the building blocks (A) and (B) and also in the species used in preparing them correspond to the definitions as used in formula (I) and preferred embodiments thereof. It is generally the case within the context of this invention that any radical, any group, and any index, including in different species, such as starting compounds and end products, for example, has the same definition. The same applies to the preferred selections of the radicals and groups and, respectively, the preferred numerical ranges of the indices. Should there be exceptionally a different preference in any case, then this is indicated accordingly.

Building Block (A) Containing Urea Groups and/or Urethane Groups

The building block (A) comprises a group which is reactive toward alcohols and/or amines, and which preferably is an isocyanate group (alternative (A1)) or uretdione group (alternative (A2)).

Alternative (A1): Building Block Containing Urea Groups and/or Urethane Groups

First of all an isocyanate-functional building block (A1) of the formula (II)

[R1-Z1]$_m$-R2-NCO    (II)

is prepared, by reacting
one or more species of the formula (III)

R1-X—H    (III)

in which X is O or N(R7), wherein R7 is H, an alkyl radical having 1 to 12 carbon atoms, an aryl radical having 6 to 12 carbon atoms or an alkylaryl radical having 7 to 12 carbon atoms,
with one or more species of the general formula (IV)

R2(NCO)$_{m+1}$    (IV).

Preferably X is oxygen and m is 1 to 4, more preferably 1 or 2, and very preferably m is 1.

As diisocyanates (m=1) it is possible with preference to use all diisocyanates which fall within the definition of the radicals R2 and of the index m according to the general formula (I). Mixtures thereof can also be used.

Examples of such diisocyanates are 1,4-tetramethylene diisocyanate, 1,6-hexamethylene diisocyanate, 2,2,4-trimethyl-1,6-hexamethylene diisocyanate, 1,10-decamethylene diisocyanate, 1,4-cyclohexylene diisocyanate, p-phenylene diisocyanate, m-phenylene diisocyanate, 2,6-tolylene diisocyanate, 2,4-tolylene diisocyanate, and mixtures thereof, p- and m-xylylene diisocyanate, 1,5-naphthylene diisocyanate, isophorone diisocyanate, 4-4',-diisocyanatodicyclohexylmethane, 3,3'-dimethyl-4,4'-bisphenylene diisocyanate, 3,3'-dimethyldiisocyanatodiphenylmethane, the isomer mixtures of 2,4'- and 4-4'-diisocyanatodiphenylmethane, and C36 dimer diisocyanate.

Particularly preferred isocyanates are toluene diisocyanate (TDI) and isophorone diisocyanate (IPDI), including in combination or as a mixture of their isomers, more particularly as a mixture of 2,4-TDI and 2,6-TDI.

The preparation of such preferred monoadducts of a diisocyanate and a monoalcohol or monoamine is also described for example in EP 1 188 779 A1.

Alternative (A2): Building Block Containing Urea Groups and/or Urethane Groups

Dimerization of diisocyanates is a known route to diisocyanate-functional uretdiones. These uretdiones can be reacted on the two free isocyanate groups with one or more species of the general formula (III)

R1-X—H    (III)

in which X is O or N(R7), wherein R7 is H, an alkyl radical having 1 to 12 carbon atoms, an aryl radical having 6 to 12 carbon atoms or an alkylaryl radical having 7 to 12 carbon atoms,
with retention of the uretdione function, to give corresponding uretdione-functional urethanes and ureas, respectively.

Particular suitability is possessed by the diisocyanate-functional uretdione dimers of the diisocyanates stated under alternative (A1).

With preference X is oxygen, and so the free isocyanate group groups are consumed by reaction to give urethane groups. In this way a uretdione-functional diurethane is obtained.

Particularly preferred isocyanate-functional uretdiones are the dimers of hexamethylene diisocyanate, TDI, and IPDI.

Of the alternatives (A1) and (A2), alternative (A1) is preferred.

Building Block (B) Containing Amide Groups

Additionally a building block (B) containing amide groups is prepared, of the formula (V)

(HX)$_k$—R3-Z3-[R4-Z4-R5-Z5]$_n$-R6-E'    (V)

in which E' is E or COOR$^d$ and R$^d$ represents a protecting group which, after the reaction of the building block (B) with building block (A), is converted preferably by hydrolysis into group E. The group R$^d$ is preferably a radical selected from the group consisting of alkyl groups, alkenyl groups or alkylaryl groups, more particularly methyl, ethyl, n-propyl, isopropyl, allyl, n-butyl, sec-butyl, t-butyl, benzhydryl, and benzyl group, and also trialkylsilyl groups, more particularly the trimethylsilyl group.

Preferably E' is a group E, and very preferably is a COOH group.

The building block (B) containing amide groups is prepared preferably by one of the pathways below.

Alternative B1:

One or more species of the general formula (VI)

Y—(O=C)—R4-(C=O)—Y'    (VI)

wherein Y and Y' independently of one another are OR$^e$ or halide, or Y and Y' are connected to one another and together, as Y—Y', are an oxygen atom, and wherein R$^e$ is hydrogen or R$^d$,
are reacted with one or more diamines of the general formula (VII)

H$_2$N—R5-NH$_2$    (VII)

optionally in the presence of one or more species of the general formula (VIII)

(HX)$_k$—R3-NH(R8)    (VIII)

wherein X is defined as in formula (III) and preferably is oxygen,
R8 preferably is H, or is
an alkyl radical having 1 to 12 carbon atoms, which optionally contains one or more ether oxygen atoms and/or carries one or more hydroxyl groups,
an aryl radical having 6 to 12 carbon atoms, an alkylaryl radical having 7 to 12 carbon atoms, or, less preferably, is
a radical —R3'[-Z2-R2-[Z1-R1]$_m$]k',
in which
R3' is a (k'+1)-valent organic radical, which is otherwise defined like radical R3,
R1, R2, Z1, and Z2 are defined as in formula (I),
m' is defined like m, with the proviso that
k=1 to 4, k'=1 to 4, and k+k'=2 to 5, preferably k+k'=2 to 4, more preferably k+k'=2 or 3, very preferably k+k'=2,
and
and, in the case of the formation of a terminal radical —R5-NH$_2$, this radical is reacted
(a) with one or more species of the general formula (VIa)

Y—(O=C)—R6-E'    (VIa)

in which, if E' is (C=O)—Y', Y and Y' are defined as in formula (VI),
or
(b) with one or more species of the general formula (X)

H$_2$C=C(R$^f$)-E'    (X)

wherein R$^f$ is hydrogen or an alkyl radical having 1 or 2 carbon atoms, more preferably is hydrogen,
in a stoichiometric ratio such that the resulting building block (B) containing amide groups contains exactly one end group E'.

The dicarboxylic acids are preferably aliphatic, cycloaliphatic or aromatic, linear or branched, saturated or unsaturated dicarboxylic acids having at least 2, more preferably 3 to 40, carbon atoms.

Examples of such dicarboxylic acids are adipic acid, oxalic acid, malonic acid, succinic acid, glutaric acid, pimelic acid, suberic acid, sebacic acid, azelaic acid, undecanedioic acid, 1,11-undecanedicarboxylic acid, dodecanedioic acid, hexadecanedioic acid, docosanedioic acid, maleic acid, fumaric acid, terephthalic acid or isophthalic acid, used alone or in mixtures. Acid anhydrides such as maleic anhydride, glutaric anhydride, phthalic anhydride, and succinic anhydride, optionally modified with alkyl or alkylene groups, such as dodecenylsuccinic anhydride, for example, are likewise included in the invention. Polymeric dicarboxylic acids such as, for example, the dicarboxylic acid of polybutadiene may also be used, as may hydroxy-functional dicarboxylic acids such as, for example, tartaric acid, maleic acid and hydroxyphthalic acid.

Dimerized fatty acids as well, known to the skilled person as dimer acids, are preferred as dicarboxylic acids for preparing the additives of the invention. These dimer acids may comprise not only a low monomer content but also a fraction of preferably not more than 5 percent by weight of trimer acid.

Suitable oligomerized fatty acids are preferably dimers of unsaturated monocarboxylic acids, the monocarboxylic acids having customarily 10 to 28 carbon atoms, preferably 12 to 24 carbon atoms, more preferably 14 to 20 carbon atoms, and very preferably 16 to 18 carbon atoms.

Oligomerized fatty acids which are likewise suitable are preferably dimers of unsaturated long-chain monocarboxylic acids, in which case the long-chain monocarboxylic acids have customarily 10 to 28 carbon atoms, preferably 12 to 24 carbon atoms, more preferably 14 to 20 carbon atoms, and very preferably 16 to 18 carbon atoms, with unsaturated short-chain monocarboxylic acid, where the short-chain monocarboxylic acids have 3 to 9 carbon atoms. A typical example of such a dimer is 5-(or 6-)carboxy-4-hexylcyclohex-2-ene-1-octanoic acid, a monocyclic dicarboxylic acid having 21 carbon atoms.

Preferred fatty acids for preparing the dimer acids are, for example, tall oil fatty acid, oleic acid, tallow fatty acids, linoleic acid, linolenic acid (cis and trans isomers), myristoleic acid, cis-6-hexadecenoic acid, (9E,12E)-octadeca-9,12-dienoic acid, docosahexaenoic acid, abietic acid, pimaric acid, hexadecatrienoic acid, parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, α-calendic acid, β-calendic acid, crepenynic acid, dihomo-γ-linolenic acid, petroselinic acid, punicic acid, 10E,12Z-octadeca-9,11-dienoic acid, γ-linolenic acid, eicosadienoic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, cis-13-eicosenoic acid, vaccenic acid, 15-docosenoic acid, 17-tetracosenoic acid, elaidic acid, cis-11-eicosenoic acid, mead acid, erucic acid, nervonic acid.

Examples of suitable hydroxy-functional unsaturated fatty acids for preparing dimer acids are dimorphecolic acid, densipolic acid, and lesquerolic acid.

In one particularly preferred embodiment, R4 in the species of the formula (VI) is a hydrocarbon radical having 30 to 34 carbon atoms. With very particular preference the radicals Y and Y' in (VI) are each a hydroxyl group.

It is particularly preferred, moreover, for R6 in the species of the formula (VIa) to have the definition of R4, and with very particular preference to be identical to R4. With very particular preference, in (VIa), the radical Y is a hydroxyl group and the radical E' is a COOH group.

The diamines H$_2$N—R5-NH$_2$ are preferably ethylenediamine, neopentanediamine, 1,2- and 1,3-propanediamine, 1,4-butanediamine, 1,5-pentanediamine, 2-butyl-2-ethyl-1,5-pentanediamine, 1,6-hexamethylenediamine, 1,8-octamethylenediamine, 1,12-dodeca-methylenediamine, cyclohexyldiamine, 4,4'-diaminodicyclohexylmethane, 3,3'-dimethyl-4,4'-diaminodicyclohexylmethane,
isophoronediamine, 4,4'-diaminodiphenylmethane, and also para- and meta-xylylenediamine.

Diamines which can be used likewise include those which contain ether oxygen atoms, such as, for example, 4,7-dioxadecane-1,10-diamine, 4,11-dioxatetradecane-1,14-diamine, 4,7,10-trioxadecane-1,13-diamine, polyoxyalkylenediamines which contain ethylene oxide and/or propylene oxide groups in random or blockwise arrangements, possess a number-average molecular weight of 148 to 4000 g/mol, and are available, for example, as Jeffamine® D 230, D 400, D 2000, D 4000, and Jeffamine® ED 600, ED 900, ED 2003, and EDR 148 from Huntsman, polytetrahydrofurandiamines such as, for example, bis(3-aminopropyl)polytetrahydrofuran 350, 750, 1100, and 2100 (the numbers indicate the approximate molecular weight).

Preference is given to using 1,6-hexamethylenediamine, 1,8-octamethylenediamine, and meta-xylylenediamine.

It is likewise possible to use amines of the type H$_2$N—R''—NR'—R''—NH$_2$, wherein R' is (C1-C18)-alkyl or (C1-C4)-alkoxy and R'' independently is a C1- to C6-alkylene radical. One example thereof is N,N'-bis(3-aminopropyl) methylamine.

Species of the general formula (HX)$_k$—R3-NH(R8) used are preferably monoamino alcohols with a primary amino group, such as, for example, 2-aminoethanol, 3-amino-1- propanol, 1-amino-2-propanol, 2-(2-aminoethoxy)ethanol, 2-ethyl-2-amino-1,3-propanediol, and 2-amino-2-hydroxymethyl-1,3-propanediol. It is, however, also possible, for example, for monoamino alcohols having a secondary amino group to be used, such as, for example, diethanolamine, 3-(2-hydroxyethylamino)-1-propanol or diisopropanolamine. Particularly preferred for use as species of the general formula $(HX)_k$—R3-NH(R8) are the following monoamino alcohols with a primary amino group: 2-aminoethanol, 3-amino-1-propanol, 1-amino-2-propanol, 2-(2-aminoethoxy)ethanol, and 2-amino-2-hydroxymethyl-1,3-propanediol, among which 2-aminoethanol and 2-amino-2-hydroxymethyl-1,3-propanediol are especially preferred. All of the aforesaid amines may have alkoxylation, more particularly ethoxylation and/or propoxylation, on the hydroxyl groups.

The stoichiometric ratio of the starting compounds is selected such that the resulting building block (B) containing amide groups comprises exactly one end group E'.

Alternative B2:

Alternatively to B1 it is possible first to react one or more amino carboxylic acids of the general formulae (IXa) and/or (IXb)

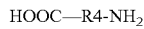
HOOC—R4-NH$_2$ (IXa)

and/or

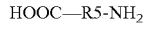
HOOC—R5-NH$_2$ (IXb)

in a polycondensation reaction in the presence of one or more species of the general formula (VIII)

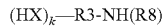
$(HX)_k$—R3-NH(R8) (VIII), in which X is defined as in formula (III) and preferably is oxygen,
R8 preferably is H, or is
an alkyl radical having 1 to 12 carbon atoms, which optionally contains one or more ether oxygen atoms and/or carries one or more hydroxyl groups,
an aryl radical having 6 to 12 carbon atoms,
an alkylaryl radical having 7 to 12 carbon atoms, or, less preferably, is
a radical —R3'-[-Z2-R2-[Z1-R1]$_m$]$_{k'}$,
in which
R3' is a (k'+1)-valent organic radical, which is otherwise defined like radical R3,
R1, R2, Z1, and Z2 are defined as in formula (I),
m' is defined like m, with the proviso that
k=1 to 4, k'=1 to 4, and k+k'=2 to 5, preferably k+k'=2 to 4, more preferably k+k'=2 or 3, very preferably k+k'=2,
and to react the species thus obtained in turn
(a) with one or more species of the general formula (VIa)

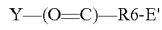
Y—(O=C)—R6-E' (VIa)

in which, if E' is (C=O)—Y', Y and Y' are defined as in formula (VI),
or
(b) with one or more species of the general formula (X)

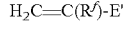
H$_2$C=C(R$^f$)-E' (X)

wherein R$^f$ is hydrogen or an alkyl radical having 1 to 2 carbon atoms, more preferably is hydrogen,
in a stoichiometric ratio such that the resulting building block (B) containing amide groups contains exactly one end group E'.

Alternative B3:

As a further alternative, it is possible to react one or more lactams of the general formula (XIa) and/or (XIb)

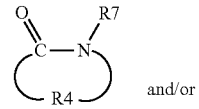
(XIa)

and/or

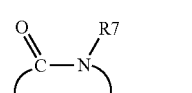
(XIb)

wherein at least one radical R7 is hydrogen by ring-opening polymerization
(a) in the presence of one or more species of the general formula (XII)

$(HO)_k$—R3-COOH (XII)

or
(b) in the presence of one or more species of the general formula

$(HX)_k$—R3-NH(R8) (VIII), in which
X is defined as in formula (III) and preferably is oxygen,
R8 preferably is H, or is
an alkyl radical having 1 to 12 carbon atoms, which optionally contains one or more ether oxygen atoms and/or carries one or more hydroxyl groups,
an aryl radical having 6 to 12 carbon atoms,
an alkylaryl radical having 7 to 12 carbon atoms, or, less preferably, is a radical —R3'-[-Z2-R2-[Z1-R1]$_m$]$_{k'}$,
in which
R3' is a (k'+1)-valent organic radical, which is otherwise defined like radical R3,
R1, R2, Z1, and Z2 are defined as in formula (I),
m' is defined like m, with the proviso that
k=1 to 4, k'=1 to 4, and k+k'=2 to 5, preferably k+k'=2 to 4, more preferably k+k'=2 or 3, very preferably k+k'=2,
wherein, in the case (b), the species thus obtained are reacted in turn
(c) with one or more species of the general formula (VIa)

Y—(O=C)—R6-E' (VIa)

in which, if E' is (C=O)—Y', Y and Y' are defined as in formula (VI),
or
(d) with one or more species of the general formula (X)

H$_2$C=C(R$^f$)-E' (X)

wherein R$^f$ is hydrogen or an alkyl radical having 1 to 2 carbon atoms, more preferably is hydrogen,
in a stoichiometric ratio such that the resultant building block (B) containing amide groups contains exactly one end group E'.

Formation of the Species of the Formula (I)

Reaction of the building block (A) containing urea groups and/or urethane groups with the building block (B) containing amide groups forms the structure (Ia)

$[[R1-Z1]_m-R2-Z2]_k-R3-Z3-[R4-Z4-R5-Z5]_n-R6-E'$ (Ia)

This corresponds to the formula (I) when E' is E. If E' is COOR$^d$, in which R$^d$ represents a protecting group, it is necessary to convert the protecting group into the group E. This may be done, for example, by hydrolysis with elimination of the alcohol R$^d$OH. This is optionally accompanied or followed by salt formation on the part of the carboxylic acid group.

In principle the species of the formula (I) may be prepared by (i) preparing the building block (A) by the process (A1) and the building block (B) by the process according to (B1 (a)) and then reacting the building blocks to give a species of the general formula (Ia), and, if E' is COOR$^d$, converting E' to E; or (ii) preparing the building block (A) by the process (A1) and the building block (B) by the process according to (B1 (b)) and then reacting the building blocks to give a species of the general formula (Ia), and, if E' is COOR$^d$, converting E' to E; or (iii) preparing the building block (A) by the process (A1) and the building block (B) by the process according to (B2(a)) and then reacting the building blocks to give a species of the general formula (Ia), and, if E' is COOR$^d$, converting E' to E; or (iv) preparing the building block (A) by the process (A1) and the building block (B) by the process according to (B2(b)) and then reacting the building blocks to give a species of the general formula (Ia), and, if E' is COOR$^d$, converting E' to E; or (v) preparing the building block (A) by the process (A1) and the building block (B) by the process according to (B3(a)) and then reacting the building blocks to give a species of the general formula (Ia), and, if E' is COOR$^d$, converting E' to E; or (vi) preparing the building block (A) by the process (A1) and the building block (B) by the process according to (B3(b)(c)) and then reacting the building blocks to give a species of the general formula (Ia), and, if E' is COOR$^d$, converting E' to E; or (vii) preparing the building block (A) by the process (A1) and the building block (B) by the process according to (B3(b)(d)) and then reacting the building blocks to give a species of the general formula (Ia), and, if E' is COOR$^d$, converting E' to E.

In particular it is possible for one or more species resulting from process (A1) and/or process (A2) to be reacted with one or more species resulting from process (B1), process (B2) and/or process (B3). If E' is COOR$^d$, wherein R$^d$ represents a protecting group, the protecting group is subsequently eliminated, where E' is converted, optionally with salt formation, into E.

In procedures (i) to (vii) above it is possible instead of the process (A1) also to carry out the less preferred process (A2) in order to prepare the building block (A).

Particular preference is given to procedures (i) and (ii), and very particular preference to procedure (i).

More particular preference is given to the procedure (i) wherein the species of the general formulae (VI) and (VIa) are identical and the stoichiometry of the components is selected such that in the preparation of building block (B), obtained by the process (B1), a building block having the terminal radical R6-E is formed directly, in other words obviating the process steps B1(a) and B1(b).

Storage and Supply Forms of the Rheology Control Agents of the Invention

For practical utility it is useful to provide the rheology control agents of the invention in liquid form, preferably in a form which is liquid under use conditions, more preferably in the form which is liquid at room temperature, in other words 25° C. The term "liquid form" is broad herein, hence comprehending, for example, any liquid form from runny through viscous and highly viscous and onto pasty or gel like. With preference the rheology control agent compositions of the invention, which comprise these rheology control agents of the invention, are also in liquid form at room temperature, more preferably in the form of a solution of the rheology control agent in a solvent.

Suitable solvents are all known organic solvents, examples therefore including alcohols, esters, aliphatic and aromatic hydrocarbons, halogenated solvents, especially polar-aprotic solvents.

In one particular embodiment the rheology control agent compositions of the invention are present as a solution in aprotic organic solvents. Particularly suitable are polar, aprotic organic solvents, very preferably those selected from the group of amides, lactams, sulfoxides, and ionic liquids (i.e., organic salts with a melting point ≤80° C.). It is therefore preferred for corresponding rheology control agent compositions of the invention to be prepared in these polar, aprotic organic solvents and/or ionic liquids.

Particularly preferred polar, aprotic organic solvents here are substituted or unsubstituted, preferably unsubstituted, N-alkylbutyrolactams, dialkyl sulfoxides, substituted or unsubstituted amides, especially carboxamides. Examples of N-alkylbutyrolactams are N-methylbutyrolactam, N-ethylbutyrolactam, N-octylbutyrolactam, and N-hydroxy-ethylbutyrolactam. An example of a dialkyl sulfoxide is dimethyl sulfoxide. Examples of amides are N,N-dimethylformamide, N,N-dimethylacetamide, N,N-dialkylamidoalkyl esters, N,N-dialkylamidoalkyl ethers, hexamethylphosphoramide, and acylmorpholines. Preferred ionic liquids with solvent suitability are substituted imidazolium salts such as, for example, 1-ethyl-3-methylimidazolium acetate, 1-ethyl-3-methylimidazolium acetate, 1-ethyl-3-methylimidazolium ethylsulfate, 1-butyl-3-methylimidazolium ethylsulfate, 1-ethyl-3 methylimidazolium thiocyanate, and 1-butyl-3-methylimidazolium thiocyanate. Corresponding solvents can also be used in combinations.

Among the solvents, preference is given to dimethyl sulfoxide and in particular to those N-alkylbutyrolactams whose nitrogen-bonded alkyl radical is linear or branched, preferably linear, and the alkyl radical contains 1 to 20 or preferably 1 to 16, more preferably 1 to 12, very preferably 3 to 10 carbon atoms, and also to N,N-dimethylamidoalkyl esters, N,N-dimethylamidoalkyl ethers, formylmorpholine, and acetylmorpholine.

Depending on particular application, particular preference is given to those solvents which have a corresponding miscibility with water, as for example to N-methylbutyrolactam, N-ethylbutyrolactam, N-propylbutyrolactam, N-butylbutyrolactam, and dimethyl sulfoxide.

In order to improve the dissolution properties of the solvents it is common also to add salts, in other words ionogenic compounds. With preference these are salts of cations of main groups I and II of the Periodic Table of the Elements (alkali and alkaline earth metals), or ammonium salts, preferably lithium, calcium or magnesium salts, more preferably lithium or calcium salts. Preferred anions are monovalent anions, more preferably halide, pseudohalide, formate, acetate and/or nitrate, very preferably chloride, acetate and/or nitrate.

In one preferred embodiment, besides one or more of the urea- and/or urethane-substituted amides of the formula (I) of the invention and/or the rheology control agents of the invention or prepared in accordance with the invention, the rheology control agent compositions of the invention comprise an organic solvent, preferably a polar, aprotic organic solvent, and optionally one or more ionogenic compounds. Organic solvents and ionogenic compounds that are preferred are more particularly those stated above, recited under the heading "Storage and supply forms of the rheology control agents of the invention".

Preferably the rheology control agent compositions of the invention, based in each case on the total weight of the rheology control agent composition, comprises
- (i) 5 to 70 wt %, preferably 10 to 60 wt %, more preferably 15 to 50 wt %, and very preferably 15 to 45 wt %, of one or more urea- and/or urethane-substituted amides of the formula (I) or rheology control agents obtainable by the process of the invention,
- (ii) 30 to 95 wt %, preferably 40 to 90 wt %, more preferably 50 to 85 wt %, and very preferably 55 to 85 wt %, of one or more solvents, and
- (iii) 0 to 4 wt %, preferably 0 to 3 wt %, more and very preferably 0 to 2 wt % of one or more ionogenic compounds.

Where the aforesaid rheology control agent composition consists of the aforesaid constituents (i), (ii), and (iii), the percentage data of the broadest ranges or preferred ranges or more preferred ranges or very preferred ranges for (i), (ii), and (iii), respectively, add up in each case to 100 wt %. In such an event it is the case, for example, that 5 to 70 wt % of (i), 30 to 95 wt % of (ii), and 0 to 3 wt % of (iii) add up to 100 wt %, or that 10 to 60 wt % of (i), 40 to 90 wt % of (ii), and 0 to 2.5 wt % of (iii) add up to 100 wt %, etc.

In all aforementioned rheology control agent compositions and those recited hereinafter, it is preferred for the solvent to be a polar, preferably aprotic organic solvent, which in turn is preferably selected from the group consisting of N-alkylbutyrolactams, dialkyl sulfoxides, and carboxamides.

In all aforementioned rheology control agent compositions and those recited hereinafter, it is preferred for the ionogenic compound to be a salt, which is preferably selected from the group consisting of halides, pseudohalides, formates, acetates, nitrates, and more preferably is selected from the group of halides and nitrates.

With particular preference the rheology control agent compositions of the invention, based in each case on the total weight of the rheology control agent composition, comprise
- (i) 10 to 60 wt % of one or more urea- and/or urethane-substituted amides of the formula (I) or rheology control agents obtainable by the process of the invention,
- (ii) 40 to 90 wt % of one or more organic solvents, and
- (iii) 0 to 3 wt % of one or more ionogenic compounds.

If aforesaid constituents (i), (ii), and (iii) add up to 100 wt %, based on the total weight of the rheology control agent composition, said composition consists of (i), (ii), and (iii).

With very particular preference the rheology control agent compositions of the invention, based in each case on the total weight of the rheology control agent composition, comprise
- (i) 15 to 50 wt % of one or more urea- and/or urethane-substituted amides of the formula (I) or rheology control agents obtainable by the process of the invention,
- (ii) 50 to 85 wt % of one or more organic solvents selected from the group of polar-aprotic organic solvents,
- (iii) 0 to 2.5 wt % of one or more ionogenic compounds selected from the group of halides, pseudohalides, formates, acetates, nitrates.

If aforesaid constituents (i), (ii), and (iii) add up to 100 wt %, based on the total weight of the rheology control agent composition, said composition consists of (i), (ii), and (iii).

With exceptional preference the rheology control agent compositions of the invention, based in each case on the total weight of the rheology control agent composition, comprise
- (i) 15 to 45 wt % of one or more urea- and/or urethane-substituted amides of the formula (I) or rheology control agents obtainable by the process of the invention,
- (ii) 55 to 85 wt % of an organic solvent selected from the group encompassing N-alkylbutyrolactams, dialkyl sulfoxides, and carboxamides,
- (iii) 0 to 2 wt % of one or more ionogenic compounds selected from the group of halides and nitrates.

If aforesaid constituents (i), (ii), and (iii) add up to 100 wt %, based on the total weight of the rheology control agent composition, said composition consists of (i), (ii), and (iii).

Fields of Use of the Rheology Additives of the Invention

The rheology control agents of the invention are suitable preferably for the rheology control of liquid aqueous or unaqueous systems, but especially of aqueous systems.

Aqueous systems are those comprising water as their main solvent or, indeed, their sole solvent. Preferred aqueous systems are those containing less than 35 wt %, more preferably less than 25 wt %, very preferably less than 20 wt % of organic solvents, based on the sum total of the parts by weight of organic solvents plus water. Aqueous systems may comprise, in addition to the species of the formula (I) converted optionally into their salt form, water-soluble organic or inorganic substances, including, for example, salts, more particularly the ionogenic compounds stated in the preceding section.

The invention also relates to the use of preparations of the invention for the rheology control of a liquid composition. This liquid composition takes the form preferably of a coating material, more particularly a paint, a plastics formulation, a pigment paste (e.g., effect pigment paste), a sealant formulation, a cosmetic, a ceramic formulation, an adhesive formulation, a liquid formulation for use in gas and oil extraction, a liquid formulation for producing electrical components and circuits (e.g., in "printed electronics"), a liquid formulation for use in energy storage media (e.g., batteries), a cleaning product, a casting compound, a building material formulation, a lubricant, a troweling compound, a wax emulsion, a metalworking fluid, or in the form of a spraying agent (e.g., as a deposition aid in crop protection products), a printing ink or a liquid ink, in the form of inkjet ink, for example.

The present invention, lastly, relates to a liquid composition in the form of a coating material, a plastics formulation, a pigment paste (e.g., effect pigment paste), a sealant formulation, a cosmetic, a ceramic formulation, an adhesive formulation, a liquid formulation for use in gas and oil extraction, a liquid formulation for producing electrical components and circuits, a liquid formulation for use in energy storage media, a cleaning product, a casting compound, a building material formulation, a lubricant, a troweling compound, a wax emulsion, a metalworking fluid, or in the form of a spraying agent, a printing ink or a liquid ink, and which contains preferably 0.1 to 7 wt % of the rheology control agent of the invention, based on the total weight of the formulation. The invention relates preferably to a liquid composition (in other words a formulation) which 0.2 to 5 wt %, more preferably 0.3 to 3 wt %, based on the total weight of the liquid composition including the rheology control agent of the invention.

Particular preference here is given to the use of the preparation of the invention as rheology control agent for the rheology control of paints, printing inks, liquid inks (such as inkjet inks, for example), plastics formulations, cosmetic preparations, cleaning products, building material formulations, metalworking fluids, lubricants, greases and/or adhesives, and also in formulations employed in the extraction of natural gas and petroleum.

The paints, printing inks, and liquid inks, more particularly inkjet inks, in question are preferably water-based paints, printing inks, and liquid inks, more particularly inkjet inks. Paints can be used in a very wide variety of different application segments, including the sectors of automobile paints, architectural paints, protective paints, for the painting, among others, of ships and bridges, can-coating and coil-coating paints, wood and furniture paints, industrial paints, paints for the coating of plastics, wire enamels, coating materials for the coating of foods and seed, and also in the form of color resists, which are used for color filters, in liquid-crystal displays, for example. The paints application sector also embraces pasty materials which in general have a very high proportion of solids and a low proportion of liquid components, examples being so-called pigment pastes or else pastes based on effect pigments such as, for example, metal effect pigments, such as, for example, aluminum pigments, silver pigments, brass pigments, zinc pigments, copper pigments, bronze pigments such as gold bronzes, oxidized bronzes, or iron oxide-aluminum pigments. The effect pigments likewise include, for example, interference pigments or pearlescent pigments such as, for example, metal oxide-mica pigments, pearl essence, bismuth oxychloride or basic lead carbonate. The plastics formulations may comprise (liquid) starting materials for producing plastics materials, which are reacted preferably by a chemical crosslinking operation ("curing" to form a thermoset). Preferred plastics formulations are unsaturated polyester resins, vinyl ester resins, acrylate resins, epoxy resins, polyurethane resins, formaldehyde resins (such as melamine-formaldehyde or urea-formaldehyde). They may be cured under a very wide variety of different conditions, including for example at room temperature (cold-curing systems) or at elevated temperature (hot-curing systems), optionally also with application of pressure ("closed mold" application, sheet molding compound or bulk molding compound). The plastics formulations also include PVC plastisols. In one particular embodiment the liquid starting material contains water or is present in a very polar organic medium.

The cosmetic preparations may be any of a host of different, preferably water-based, liquid compositions which are employed in the personal care or else health care sectors, including, for example, lotions, creams, pastes such as toothpaste, for example, foams such as shaving foam, for example, gels such as shaving gel, shower gel or active pharmaceutical ingredients in gel formulations, for example, or else shampoo, liquid soaps, nail varnishes, lipsticks, and hair colorants.

The wax emulsions are preferably dispersions of waxes—solid at room temperature—in particulate form in water or an organic medium.

In the case of the spraying agents (as deposition aids), the focus, through the use of the rheology control agents of the invention, is on drift reduction or drift avoidance, preferably in aqueous spraying compositions.

In the case of the building material formulations, the materials in question may be those which are pasty or liquid on working and which are employed in the construction sector and preferably are aqueous and become solid after curing, examples including hydraulic binders such as concrete, cement, water, tile adhesive, and plaster.

In the case of the metalworking fluids, the systems in question may preferably be water-based systems. Examples thereof are cutting fluids, drilling fluids (as used in metalworking), release agents (frequently in the form of aqueous emulsions, for aluminum diecasting and foundry applications, for example), foundry washes or foundry coatings, and fluids for the surface treatment of metals (for surface finishing, surface cleaning, and galvanizing, for example).

The lubricants are preferably water-based compositions which are employed for lubrication, in other words those agents that are used for reducing friction and wear, and also for force transmission, cooling, vibration damping, sealing, and corrosion prevention; liquid lubricants are preferred here.

In the case of the liquid formulations for use in gas and oil extraction, the formulations in question are preferably water-based fluids which are employed in opening up a reservoir or else in its subsequent harvesting. Preferred here are drilling fluids, also referred to as drilling muds. An area of use for corresponding aqueous formulations, for example, is that of hydraulic fracturing. A further area for use is that of oil-based drilling muds.

Cleaning products may serve to clean any of a wide variety of different objects. They bring about or assist the removal of contaminants, residues, and adhesions. The cleaning products also include detergents (especially for the cleaning of textiles, precursors thereof, and leather), polishes and washing products, and also personal care compositions.

The adhesives in question may be all of the operational materials which are liquid under working conditions and which are able to connect adherends by surface adhesion and internal strength. Preferred here are water-based adhesives.

In the text below, the invention is illustrated by examples.

EXAMPLES

Test Methods
Determination of Molecular Weight:

The number-average molecular weight is the numerical average of the molar mass distribution as determined by gel permeation chromatography (GPC). The molar mass distribution was determined in accordance with DIN 55672 Part 1:2007-08. The eluent used was a solution of dibutylamine (1 vol %) in tetrahydrofuran. For the calibration, narrow-distribution polystyrene standards of linear construction, with molecular weights between $M_P$ 1 000 000 and $M_P$ 162 g/mol, were analyzed.

Determination of Amine Number:

The amine number was determined in accordance with DIN 53176:2002-11, using 2-propanol as solvent for the titration. The sample (at least 0.5 g) is weighed to an accuracy of 0.1 mg into an 80 ml beaker and dissolved in 50 ml of 2-propanol. The sample is optionally heated gently until fully dissolved. The sample is placed on a magnetic stirrer and the electrode is immersed completely. The sample is titrated with 0.1 N isopropanolic hydrochloric acid.

Determination of Acid Number:

The acid number was determined in accordance with DIN EN ISO 2114:2002-06, using 2-propanol as solvent for the titration. The sample (at least 0.5 g) is weighed to an accuracy of 0.1 mg into an 80 ml beaker and dissolved in 50 ml of 2-propanol. The sample is optionally heated gently until fully dissolved. The sample is placed on a magnetic stirrer and the electrode is immersed completely. The sample is titrated with 0.1 N ethanolic KOH.

Determination of Hydroxyl Number:

The hydroxyl number of the OH-functional raw materials used for the synthesis of the isocyanate/uretdione adducts was determined in accordance with DIN ISO 4629-1:1998-07. The sample (at least 0.5 g) is weighed to an accuracy of 0.1 mg into an 80 ml weighing bottle with ground lid and dissolved in 4.8 ml of OH number reagent (14.4 g of p-toluenesulfonic acid are dissolved in 360 ml of ethyl acetate and admixed with around 60 ml of acetic anhydride). The reagent is added with a buret or a dispenser. The sample is heated at 50° C. in a water bath or block thermostat for 15 minutes. After cooling to room temperature, the sample is admixed with around 30 ml of a pyridine-water mixture (3:1) to decompose the excess acetic anhydride, and stirred for around 5 minutes. The sample is subsequently titrated with 0.5 N ethanolic KOH.

The hydroxyl number of the polyamide building blocks ("AM") was determined using a method along the lines of DIN ISO 4629. The sample (at least 0.5 g) is weighed accurately into an 80 ml weighing bottle with ground lid, and dissolved in 20 ml of tetrahydrofuran. Following addition of 10.0 ml of OH number reagent A2 (12.5 g of 4-dimethylaminopyridine are dissolved in around 500 ml of tetrahydrofuran) and 5.0 ml of reagent B (around 25 ml of acetic anhydride are dissolved in around 500 ml of tetrahydrofuran), the sample is stirred on a magnetic stirrer for 30 minutes. Around 2.0 ml of water are added and stirring is repeated for 10 minutes. The sample is subsequently titrated potentiometrically with 0.2 N ethanolic KOH.

Determination of Isocyanate Content:

The isocyanate content was determined in accordance with DIN EN ISO 9369:1997-08. The sample (at least 0.5 g) is weighed to an accuracy of 0.1 mg into an 80 ml of beaker and dissolved in around 5 ml of chlorobenzene (optionally with heating). Following addition of 9.5 ml of 0.2 N dibutylamine solution (in chlorobenzene), the sample is stirred and, after a short reaction time (1 minute) around 30 ml of ethanol are added. The excess dibutylamine is subsequently back-titrated with 0.1 N isopropanolic hydrochloric acid.

TABLE 1

Raw materials used

| Raw material tradename | Manufacturer | Chem. description |
|---|---|---|
| Pripol 1006 | Croda | dimer fatty acid |
| Desmodur T100 | Bayer MaterialScience (Covestro) | 2,4-toluene diisocyanate |
| Desmodur T65 | Bayer MaterialScience (Covestro) | mixture of 35% of 2,6-toluene diisocyanate and 65% 2,4-toluene diisocyanate |
| Desmodur T80 | Bayer MaterialScience (Covestro) | mixture of 20% 2,6-toluene diisocyanate and 80% 2,4-toluene diisocyanate |
| Desmodur N3400 | Bayer MaterialScience (Covestro) | aliphatic polyisocyanate (HDI-uretdione) |
| DBTL | Brenntag | dibutyltin dilaurate |
| Jeffamin ED-600 | Huntsman | polyetherdiamine |

Preparation of Isocyanate Adducts (AD) as Building Blocks (A) Containing Urea Groups and/or Urethane Groups
Isocyanate Adduct AD1:

At first 90.00 g of a monoadduct in accordance with patent specification EP 1188779 are prepared from a lauryl alcohol and 2,4-toluene diisocyanate. The reaction product is waxlike and has an NCO content of 11.1 wt %.

Isocyanate Adduct AD2:

At first 436.8 g of a monoadduct in accordance with patent specification EP 1188779 are prepared from a polyethylene glycol monomethyl ether having a hydroxyl number of 125 mg KOH/g and a mixture of 35% 2,6-toluene diisocyanate and 65% 2,4-toluene diisocyanate.

Isocyanate Adduct AD3:

125 g of a monoadduct in accordance with patent specification EP 1188779 are prepared from butylpolyethylene glycol having a hydroxyl number of 270 mg KOH/g and a mixture of 35% 2,6-toluene diisocyanate and 65% 2,4-toluene diisocyanate.

Isocyanate Adduct AD4:

125 g of a monoadduct in accordance with patent specification EP 1188779 are prepared from a C13-C15 fatty alcohol ethoxylated with 5 mol of ethylene oxide and having a hydroxyl number of 140 mg KOH/g and a mixture of 20% 2,6-toluene diisocyanate and 80% 2,4-toluene diisocyanate. The adduct prepared contains 7.15 wt % NCO.

Isocyanate Adduct AD5:

200 g of a monoadduct in accordance with patent specification EP 1188779 are prepared from a isotridecyl alcohol and a mixture of 20% 2,6-toluene diisocyanate and 80% 2,4-toluene diisocyanate. The adduct prepared contains 10.7 wt % NCO.

Isocyanate Adduct AD6:

200 g of a monoadduct in accordance with patent specification EP 1188779 are prepared from butylpolyethylene glycol having a hydroxyl number of 270 mg KOH/g and isophorone diisocyanate. The adduct prepared contains 8.10 wt % NCO.

Uretdione Adduct AD7:

A four-neck flask is provided with stirrer, dropping funnel, thermometer, and reflux condenser. It is charged with 71.42 g (0.14 mol) of a polyethylene glycol monomethyl ether having a hydroxyl number of 113 mg KOH/g, and this initial charge is heated to 80° C. under a nitrogen atmosphere. Then 28.57 g (0.07 mol) of Desmodur N3400 are added by means of a dropping funnel over the course of 10 minutes, and the mixture is homogenized over a period of 10 minutes. Thereafter, 0.01 g of DBTL is added for catalysis of the reaction. After a reaction time of 3 hours at 80° C., a pale, viscous liquid is obtained.

Preparation of Polyamides (AM) as Building Blocks (B) Containing Amide Groups
Polyamide AM1:

A four-neck flask with stirrer, cooler, thermometer, and water separator is charged with 29.64 g of N-ethylpyrrolidone, and 0.07 mol of hexamethylenediamine (10.27 g of an 80% aqueous solution) and 0.035 mol of aminoethanol (2.14 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 18.9 mg KOH/g.

Polyamide AM2:

A four-neck flask with stirrer, cooler, thermometer, and water separator is charged with 39.71 g of N-ethylpyrrolidone, and 0.105 mol of hexamethylenediamine (15.40 g of an 80% aqueous solution) and 0.035 mol of aminoethanol (2.14 g) are added. The solution is heated to 100° C. and the apparatus is inertized with nitrogen. 0.14 mol (82.60 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 14.1 mg KOH/g.

Polyamide AM3:

A four-neck flask with stirrer, cooler, thermometer, and water separator is charged with 30.23 g of N-methylpyrrolidone, and 0.07 mol of m-xylylenediamine (9.59 g) and 0.035 mol of aminoethanol (2.14 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 18.9 mg KOH/g.

Polyamide AM4:

A four-neck flask with stirrer, cooler, thermometer, and water separator is charged with 30.42 g of N-methylpyrrolidone, and 0.08 mol of Jeffamine ED-600 (48.48 g), 0.08 mol of aminoethanol (4.89 g), and 0.16 mol (23.38 g) of adipic acid are added. The apparatus is inertized with nitrogen and the mixture is heated with water separation, gradually up to 170° C., and is held at this temperature until no further water of reaction distils over. The reaction is monitored via determination of the amine number of the product prepared. The hydroxyl number is 45.9 mg KOH/g.

Polyamide AM5:

A four-neck flask with stirrer, cooler, thermometer, and water separator is charged with 29.85 g of N-methylpyrrolidone, and 0.07 mol of hexamethylenediamine (10.27 g of an 80% aqueous solution) and 0.035 mol of 1-amino-2-propanol (2.63 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 21.4 mg KOH/g.

Polyamide AM6:

A four-neck flask with stirrer, cooler, thermometer, and water separator is charged with 24.65 g of N-octylpyrrolidone, and 0.15 mol of hexamethylenediamine (22.01 g of an 80% aqueous solution) and 0.05 mol of aminoethanol (3.06 g) are added. The solution is heated to 100° C. and the apparatus is inertized with nitrogen. 0.2 mol (40.45 g) of decanedioic acid is added in portions to this solution at 100° C. With water separation, the temperature is raised gradually up to 190° C. and maintained at this temperature until no further water of reaction is distilled over. The reaction is monitored via determination of the amine number of the product prepared. The hydroxyl number is 34.0 mg KOH/g.

Polyamide AM7:

A four-neck flask with stirrer, cooler, thermometer, and water separator is charged with 29.85 g of N-octylpyrrolidone, and 0.07 mol of hexamethylenediamine (10.27 g of an 80% aqueous solution) and 0.035 mol of 1-amino-2-propanol (2.63 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 19.6 mg KOH/g.

Polyamide AM8:

A four-neck flask with stirrer, cooler, thermometer, and water separator is charged with 30.23 g of N-octylpyrrolidone, and 0.07 mol of m-xylylenediamine (9.59 g) and 0.035 mol of aminoethanol (2.14 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 17.1 mg KOH/g.

Polyamide AM9:

A four-neck flask with stirrer, cooler, thermometer, and water separator is charged with 30.42 g of N-octylpyrrolidone, and 0.08 mol of Jeffamine ED-600 (48.48 g), 0.08 mol of aminoethanol (4.89 g), and 0.16 mol (23.38 g) of adipic acid are added. The apparatus is inertized with nitrogen and the mixture is heated with water separation, gradually up to 170° C., and is held at this temperature until no further water of reaction distils over. The reaction is monitored via determination of the amine number of the product prepared. The hydroxyl number is 39.9 mg KOH/g.

Polyamide AM10:

A four-neck flask with stirrer, cooler, thermometer, and water separator is charged with 29.64 g of N-methylpyrrolidone, and 0.07 mol of hexamethylenediamine (10.27 g of an 80% aqueous solution) and 0.035 mol of aminoethanol (2.14 g) are added. The solution is heated to 100° C. and the apparatus is inertized with nitrogen. 0.105 mol (61.95 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 18.9 mg KOH/g.

Polyamide AM11:

A four-neck flask with stirrer, cooler, thermometer, and water separator is charged with 33.9 g of N-ethylpyrrolidone, and 0.08 mol of butanediamine (7.05 g) and 0.04 mol of tris(hydroxymethyl)aminomethane (4.84 g) are added. The solution is heated to 100° C. and the apparatus is inertized with nitrogen. Subsequently 0.12 mol (70.8 g) of dimer fatty acid is metered into this solution at 100° C. With water separation, the temperature is raised gradually up to 170° C. and maintained at this temperature until no further water of reaction is distilled over. The reaction is monitored via determination of the amine number of the product prepared. The hydroxyl number is 46.7 mg KOH/g.

Polyamide AM12:

A four-neck flask with stirrer, cooler, thermometer, and water separator is charged with 167.48 g of N-ethylpyrrolidone, and 0.26 mol of hexamethylenediamine (37.75 g of an 80% aqueous solution) is added. The solution is heated to 100° C. and the apparatus is inertized with nitrogen. Subsequently 0.24 mol (141.6 g) of dimer fatty acid is metered into this solution at 100° C. With water separation, the temperature is raised gradually up to 160° C. and the reaction is discontinued when the amine number reaches 18.2 mg KOH/g. The acid number of the product prepared is 18.2 mg KOH/g.

Polyamide AM13:

The polyamide was prepared from 0.132 mol of hexamethylenediamine (19.17 g of an 80% aqueous solution) and 0.12 mol (70.8 g) of dimer fatty acid in accordance with patent specification DE 10 2006 010 721 A1. The amine number of the product is 18.2 mg KOH/g, the acid number 15.2 mg KOH/g.

Preparation of the Rheology Control Agents of the Invention

Example B1

In a four-neck flask with stirrer, condenser, and thermometer, 64.68 g of N-methylpyrrolidone and 29.7 g of the polyamide solution AM10 prepared (corresponding to 20.79 g (0.01 mol) of polyamide) are heated to 40° C. and the apparatus is inertized with nitrogen. With stirring, 3.74 g (0.01 mol) of the synthesized isocyanatourethane AD1, heated to around 50° C., are metered in with a pipette. The temperature is raised to 60° C. and maintained for 2.5 hours. The product obtained is amber in color and of high viscosity.

Example B2

In a four-neck flask with stirrer, condenser, dropping funnel, and thermometer, 996.3 g of N-ethylpyrrolidone and 450.0 g of the polyamide solution AM1 prepared (corresponding to 315 g (0.15 mol) of polyamide) are heated to 40° C. and the apparatus is inertized with nitrogen. With stirring, 61.21 g (0.15 mol) of the synthesized isocyanatourethane AD3 are added by means of the dropping funnel in a period of 20 minutes. The temperature is raised to 60° C. and maintained for 2.5 hours. The product obtained is amber in color and of high viscosity (the number average $M_n$ determined by gel permeation chromatography is 2387 g/mol).

Example B3

In a four-neck flask with stirrer, condenser, and thermometer, 71.46 g of N-ethylpyrrolidone and 29.70 g of the polyamide solution AM1 prepared (corresponding to 20.79 g (0.01 mol) of polyamide) are heated to 40° C. and the apparatus is inertized with nitrogen. With stirring, 6.00 g (0.01 mol) of the synthesized isocyanatourethane AD2 are metered in by means of a pipette in a period of 5 minutes. The temperature is raised to 60° C. and maintained for 3 hours. The product obtained is amber in color and of high viscosity (the number average $M_n$ determined by gel permeation chromatography is 2340 g/mol).

Example B4

In a four-neck flask with stirrer, condenser, and thermometer, 65.25 g of N-ethylpyrrolidone and 29.70 g of the polyamide solution AM1 prepared (corresponding to 20.79 g (0.01 mol) of polyamide) are heated to 40° C. and the apparatus is inertized with nitrogen. With stirring, 3.93 g (0.01 mol) of the synthesized isocyanatourethane AD5 are added by means of a pipette. The temperature is raised to 60° C. and maintained for 2.5 hours. The product obtained is amber in color and of high viscosity (the number average $M_n$ determined by gel permeation chromatography is 2390 g/mol).

Example B5

In a four-neck flask with stirrer, condenser, and thermometer, 64.68 g of N-methylpyrrolidone and 29.7 g of the polyamide solution AM3 prepared (corresponding to 20.79 g (0.01 mol) of polyamide) are heated to 40° C. and the apparatus is inertized with nitrogen. With stirring, 3.74 g (0.01 mol) of the synthesized isocyanatourethane AD1, warmed to around 50° C., are metered in by means of a pipette in a period of 5 minutes. The temperature is raised to 60° C. and maintained for 2.5 hours. The product obtained is amber in color and of high viscosity (the number average $M_n$ determined by gel permeation chromatography is 2230 g/mol).

Example B6

In a four-neck flask with stirrer, condenser, and thermometer, 64.88 g of N-methylpyrrolidone and 26.2 g of the polyamide solution AM5 prepared (corresponding to 18.34 g (0.01 mol) of polyamide) are heated to 40° C. and the apparatus is inertized with nitrogen. With stirring, 5.90 g (0.01 mol) of the synthesized isocyanatourethane AD4 are metered in by means of a pipette in a period of 5 minutes. The temperature is raised to 60° C. and maintained for 2.5 hours. The product obtained is amber in color and of high viscosity (the number average $M_n$ determined by gel permeation chromatography is 2265 g/mol).

Example B7

In a four-neck flask with stirrer, condenser, and thermometer, 62.72 g of N-methylpyrrolidone, 26.21 g of the polyamide solution AM10 prepared (corresponding to 18.35 g (0.01 mol) of polyamide) and 5.18 g (0.01 mol) of the synthesized isocyanatourethane AD6 are weighed out and the apparatus is inertized with nitrogen. With stirring, the mixture is heated to 60° C. and this temperature range is maintained for 3 hours. The resulting product is amber in color and of high viscosity (the number average $M_n$ determined by gel permeation chromatography is 2301 g/mol).

Example B8

In a four-neck flask with stirrer, condenser, and thermometer, 69.82 g of N-methylpyrrolidone and 25.32 g of the polyamide solution AM4 prepared (corresponding to 17.72 g (0.02 mol) of polyamide) are heated to 40° C., placed under nitrogen, and admixed with 5.0 g of a commercial zeolite in order to remove the residual water of reaction present in the amide. During this procedure, the mixture becomes cloudy. With stirring, 8.08 g (0.02 mol) of the synthesized isocyanatourethane AD3 are metered in with a pipette in a period of 5 minutes. The temperature is raised to 60° C. and maintained for 3 hours. The product obtained is amber in color and of high viscosity (the number average $M_n$ determined by gel permeation chromatography is 1481 g/mol).

Example B9

In a four-neck flask with stirrer, condenser, and thermometer, 47.7 g of N-octylpyrrolidone and 16.5 g of the polyamide solution AM6 prepared (corresponding to 11.55 g (0.01 mol) of polyamide) are weighed out, the apparatus is inertized with nitrogen, and the mixture is heated to 180° C. to form a homogeneous solution. With stirring, 6.0 g (0.01 mol) of the synthesized isocyanatourethane AD2 are metered in with a pipette in a period of 5 minutes. The temperature is maintained for 2.5 hours. The reaction product obtained is dark brown and of high viscosity.

Example B10

In a four-neck flask with stirrer, condenser, and thermometer, 80.02 g of N-ethylpyrrolidone and 39.54 g of the polyamide solution AM2 prepared (corresponding to 27.68 g (0.01 mol) of polyamide) are heated to 40° C. and the apparatus is inertized with nitrogen. With stirring, 2.95 g (0.01 mol) of the stearyl isocyanate, heated to around 45° C., are metered in with a pipette in a period of 5 minutes. 100 ppm of DBTL are added for catalysis of the reaction. The temperature is raised to 100° C. and maintained for 3 hours. The product obtained is yellowish, of high viscosity, and slightly cloudy.

Example B11

In a four-neck flask with stirrer, condenser, and thermometer, 30.21 g of N-octylpyrrolidone, 40.05 g of N-formylmorpholine and 32.8 g of the polyamide solution AM8 prepared (corresponding to 22.96 g (0.01 mol) of polyamide) are heated to 40° C. and the apparatus is inertized with nitrogen. With stirring, 3.74 g (0.01 mol) of the synthesized isocyanatourethane AD1, heated to around 50° C., are metered in with a pipette in a period of 5 minutes. The temperature is raised to 60° C. and maintained for 2.5 hours. The product obtained is yellowish and liquid (the number average $M_n$ determined by gel permeation chromatography is 2521 g/mol).

Example B12

In a four-neck flask with stirrer, condenser, and thermometer, 30.3 g of N-octylpyrrolidone, 38.88 g of N-formylmorpholine and 28.6 g of the polyamide solution AM7 prepared (corresponding to 20.02 g (0.01 mol) of polyamide) are heated to 40° C. and the apparatus is inertized with nitrogen. With stirring, 5.9 g (0.01 mol) of the synthesized isocyanatourethane AD4 are metered in with a pipette in a period of 5 minutes. The temperature is raised to 60° C. and maintained for 3 hours. The product obtained is amber in color and of high viscosity (the number average $M_n$ determined by gel permeation chromatography is 2486 g/mol).

Example B13

In a four-neck flask with stirrer, condenser, and thermometer, 33.21 g of N-octylpyrrolidone, 41.65 g of N-formylmorpholine and 28.12 g of the polyamide solution AM9 prepared (corresponding to 19.68 g (0.02 mol) of polyamide) are heated to 40° C. and the apparatus is inertized with nitrogen. With stirring, 8.08 g (0.02 mol) of the synthesized isocyanatourethane AD3 are metered in with a pipette in a period of 5 minutes. The temperature is raised to 60° C. and maintained for 3 hours. The product obtained is amber in color and liquid (the number average $M_n$ determined by gel permeation chromatography is 1603 g/mol).

Example B14

In a four-neck flask with stirrer, condenser, and thermometer, 646.8 g of N-ethylpyrrolidone, and 297.0 g of the polyamide solution AM1 prepared (corresponding to 207.9 g (0.1 mol) of polyamide) are heated to 40° C. and the apparatus is inertized with nitrogen. With stirring, 37.4 g (0.1 mol) of the synthesized isocyanatourethane AD1, heated to around 50° C., are metered in with a pipette. The temperature is raised to 60° C. and maintained for 2.5 hours. The product obtained is amber in color and of high viscosity (the number average $M_n$ determined by gel permeation chromatography is 2468 g/mol).

Example B15

A four-neck flask with stirrer, condenser, and thermometer is charged with 64.68 g of N-ethylpyrrolidone and 3.74 g (0.01 mol) of the synthesized isocyanatourethane AD1 at a temperature of 40° C., and the apparatus is inertized with nitrogen. With stirring, 29.7 g of the polyamide solution AM1 prepared (corresponding to 20.79 g (0.01 mol) of polyamide), heated to around 60° C., are metered in by dropping funnel. The temperature is raised to 60° C. and maintained for 3 hours. The product obtained is amber in color and liquid (the number average $M_n$ determined by gel permeation chromatography is 2190 g/mol).

Example B16

In a four-neck flask with stirrer, condenser, and thermometer, 646.8 g of N-ethylpyrrolidone, and 297.0 g of the polyamide solution AM1 prepared (corresponding to 207.9 g (0.1 mol) of polyamide) are heated to 40° C. and the apparatus is inertized with nitrogen. With stirring, 37.4 g (0.01 mol) of the synthesized isocyanatourethane AD1, heated to around 50° C., are metered in with a pipette. The temperature is raised to 60° C. and maintained for 2.5 hours. The reaction mixture is subsequently admixed with 0.5 wt % of lithium chloride and homogenized at 80° C. over a period of an hour. The product obtained is amber in color and liquid.

Example B17

In a four-neck flask with stirrer, condenser, and thermometer, 72.46 g of N-ethylpyrrolidone, and 30.82 g of the polyamide solution AM12 prepared (corresponding to 15.41 g (0.01 mol) of polyamide) are heated to 40° C. and the apparatus is inertized with nitrogen. With stirring, 13.88 g (0.01 mol) of the synthesized uretdione-urethane AD7, heated to around 50° C., are metered in with a pipette in a period of 5 minutes. The temperature is raised to 80° C. and maintained for 3 hours. The product obtained is yellow and viscous (the number average $M_n$ determined by gel permeation chromatography is 3709 g/mol).

Example B18

In a four-neck flask with stirrer, condenser, and thermometer, 66.41 g of N-ethylpyrrolidone and 28.84 g of the polyamide solution AM11 prepared (corresponding to 20.19 g (0.008 mol) of polyamide) are heated to 40° C. and the apparatus is inertized with nitrogen. With stirring, 4.83 g (0.008 mol) of the synthesized isocyanatourethane AD2 are metered in by means of a pipette in a period of 5 minutes. The temperature is raised to 60° C. and maintained for 2 hours. The product obtained is amber in color and viscous (the number average $M_n$ determined by gel permeation chromatography is 2839 g/mol).

Example B19

In a four-neck flask with stirrer, condenser, and thermometer, 65.72 g of N-ethylpyrrolidone and 23.43 g of the polyamide solution AM11 prepared (corresponding to 16.40 g (0.0065 mol) of polyamide) are heated to 40° C. and the apparatus is inertized with nitrogen. With stirring, 7.85 g (0.013 mol) of the synthesized isocyanatourethane AD2 are metered in by means of a pipette in a period of 5 minutes.

The temperature is raised to 60° C. and maintained for 2 hours. The product obtained is amber in color and viscous.

Example B20

In a four-neck flask with stirrer, condenser, and thermometer, 67.52 g of N-ethylpyrrolidone and 20.4 g of the polyamide solution AM11 prepared (corresponding to 14.28 g (0.0056 mol) of polyamide) are heated to 40° C. and the apparatus is inertized with nitrogen. With stirring, 10.27 g (0.017 mol) of the synthesized isocyanatourethane AD2 are metered in by means of a pipette in a period of 5 minutes. The temperature is raised to 60° C. and maintained for 2 hours. The product obtained is amber in color and viscous.

Example B21

The product of 37.0 g of the above-prepared polyamide solution AM13 (corresponding to 25.9 g (0.012 mol) of polyamide) and 8.00 g (0.012 mol) of the synthesized uretdione-urethane described in patent DE 10 2006 010 721 A1 under example 1 is prepared in accordance with patent specification DE 10 2006 010 721 A1. The product obtained is cloudy and viscous (the number average $M_n$ determined by gel permeation chromatography is 3924 g/mol).

TABLE 2

Comparative examples according to the prior art

| Comparative example | Name | Active substance in % | Manufacturer | Description |
|---|---|---|---|---|
| VB1 | Rheovis AS 1130 | 30.0 | BASF | acrylate copolymer, emulsion in water |
| VB2 | Rheovis PU 1214 | 40.0 | BASF | nonionic polyurethane-based associative thickener |
| VB3 | Disparlon AQ-610 | 15.0 | Kusumoto | polyamide-based rheology additive |
| VB4 | Disparlon AQ-870 | 15.0 | Kusumoto | liquid polyamide-based rheology additive |
| VB5 | Acrysol RM 2020 | 20.0 | Dow | nonionic urethane-based rheology modifier |
| VB6 | Acrysol RM 895 | 23.5 | Dow | solvent-free HEUR rheology modifier |
| VB7 | BYK-7420 ES | 40.0 | BYK-Chemie | solution of a modified urea |
| VB8 | Acrysol RM 8w | 21.5 | Dow | nonionic urethane-based rheology modifier |
| VB9 | Borchigel LW44 | 47.0 | Borchers | nonionogenic polyurethane-based thickener |
| VB10 | Example 20 from patent DE 10 2006 010 721 A1 | 30 | ./. | ./. |

Performance Testing of the Rheology Control Agents

TABLE 3

Raw materials used

| Name | Description | Manufacturer |
|---|---|---|
| Daotan VTW 6462 | urethane acrylate hybrid dispersion | Allnex S.á r.l. |
| Isobutanol | | Overlack AG |
| BYK-011 | defoamer | BYK-Chemie GmbH |
| BYK-347 | flow control additive | BYK-Chemie GmbH |
| DMEA | dimethylaminoethanol | Air Products and Chemicals Inc. |
| STAPA IL Hydrolan 2154 | aluminum effect pigment | Eckart GmbH |
| Butyl glycol | ethylene glycol monobutyl ether | Overlack AG |
| Disperbyk-180 | wetting and dispersing additive | BYK-Chemie GmbH |
| Bayhydrol A145 | polyacrylate dispersion | Covestro AG |
| Disperbyk-194 | wetting and dispersing additive | BYK-Chemie GmbH |
| Tronox RKB-4 | titanium dioxide pigment | Tronox Pigments |
| BYK-345 | flow control additive | BYK-Chemie GmbH |
| BYK-333 | flow control additive | BYK-Chemie GmbH |
| Bayhydur 304 | polyisocyanate | Covestro AG |
| Dowanol PMA | 1,2-propanediol monoacetate monomethyl ether | Dow Chemical Company |
| Bayferrox 3920 | yellow iron oxide pigment | Lanxess GmbH |
| BYK-1730 | defoamer | BYK-Chemie GmbH |
| Acticide MBS | microbiocide and algicide | Thor GmbH |
| Klarlack HS Racing Clear VOC 923-135 | 2-component clearcoat | BASF Coatings GmbH (Glasurit) |
| Neocryl XK-205 | acrylate styrene copolymer | DSM Neoresins |
| AMP-90 | 2-amino-2-methyl-1-propanol | Dow Chemical Company |
| BYK-024 | defoamer | BYK-Chemie GmbH |
| BYK-346 | flow control additive | BYK-Chemie GmbH |

Test System 1: Effect Pigment Orientation of an Aluminum Basecoat Material

The effect pigment slurries are prepared according to the formulation specified in table 4. Subsequently the basecoat material is prepared according to the formulation specified in table 5. Then in each case 200 g of the basecoat material are weighed out into a 350 ml PE beaker and the respective rheology additive is incorporated with stirring using the Dispermat LV (from Getzmann) (5 min, 800 rpm, 5 cm paddle stirrer). The rheology additives are used in an added amount of 1.5% active substance, to obtain a minimum viscosity of 600 mPas for the coating system. If the minimum viscosity is not attained, the amount of the respective additive added is increased in line with the recommended amount in the technical datasheet. The basecoat materials are subsequently stored at RT overnight and then adjusted to a spray viscosity of 600-800 mPas with the Brookfield LV DV-I viscometer (from Brookfield, spindle 3 at 50 rpm) by addition of DI water. The basecoat material is applied using the APL 2.71 automatic applicator with a HVLP spray gun, 1.3 mm nozzle (from Oerter & Köhne GmbH & Co. KG) onto DIN A4 aluminum sheets (type: primed aluminum sheets, light gray on one side—285 mm×205 mm—rounded corners, manufacturer: Novelis Deutschland GmbH). After a drying time of 30 minutes at room temperature, a clearcoat material (2-component PU clearcoat HS Racing Clear VOC 923-135, from BASF Coatings) is applied manually by means of pneumatic spray application (spray gun: Sata Jet 4000 RP, 1.3 mm nozzle, from SATA GmbH & Co. KG) over the basecoat. The clearcoat is dried at RT overnight and then by forced drying for 20 minutes at 80° C. in a paint drying cabinet (FDL 115, from Binder). The orientation of the aluminum pigments was evaluated by measurement of the flop value using the BYK-mac i from BYK-Gardner. The higher the flop value, the more uniform the orientation of the aluminum pigment in the basecoat, and the more suitable the rheology additive in question for the orientation of effect pigments.

TABLE 4

Effect pigment slurry

| | |
|---|---|
| Butyl glycol | 47.9 g |
| DISPERBYK-180 | 1.5 g |
| Dispermat LV, 10 min, 800 rpm, 5 cm paddle stirrer | |
| Hydrolan IL 2154 | 50.6 g |
| Total | 100.0 g |

TABLE 5

Effect pigment basecoat material

| | |
|---|---|
| Daotan VTW 6462 | 47.6 g |
| DI water | 14.6 g |
| Isobutanol | 2.3 g |
| BYK-011 | 0.1 g |
| BYK-347 | 0.3 g |
| DMEA (10% in water) | 1.7 g |
| Effect pigment slurry | 13.8 g |
| DI water | 19.6 g |
| Total | 100.0 g |

Addition of the individual components with stirring, with further stirring for 10 minutes after addition of the last component, Dispermat LV, 5 cm paddle stirrer, 800 rpm

TABLE 6

Amounts added and results

| Product | Amount added of active substance [%] | Spray viscosity 600 m-800 mPas | Flop value |
|---|---|---|---|
| Blank sample | — | | * |
| VB1 | 1.8 | 790 | 12.9 |
| VB6 | 4 | 210** | 12.7 |
| VB4 | 0.8 (max. amount) | 140** | see below** |
| VB7 | 2 | 480** | see below** |

TABLE 6-continued

Amounts added and results

| Product | Amount added of active substance [%] | Spray viscosity 600 m-800 mPas | Flop value |
|---|---|---|---|
| B3 | 1.5 | 605 | 17.1 |
| B4 | 1.5 | 660 | 14.9 |
| B2 | 1.5 | 750 | 13.4 |
| B14 | 1.5 | 700 | 13.5 |
| B10 | 1.8 | 765 | 14.5 |
| B12 | 1.5 | 730 | 20.9 |
| B17 | 1.5 | 600 | 17.1 |
| B18 | 1.5 | 710 | 19.9 |
| B19 | 1.5 | 691 | 15.9 |
| B20 | 1.5 | 595 | 14.9 |

* a blank sample without rheology additive could not be used for coating, owing to its viscosity being much too low.
**in spite of the use of the maximum amount as indicated in the technical datasheet, the application viscosity achieved was too low and so the flop could not be measured In table 6 it is evident that comparative examples VB4, VB6 and VB7, in spite of a higher amount deployed in some cases, do not achieve the required minimum viscosity for spray application, and/or this viscosity cannot be achieved even by increasing the amount added according to the datasheet.

The coating results for comparative examples VB4 and VB7 are so poor that the flop value cannot be measured. Comparative example VB4 was added with the maximum amount as per the technical datasheet.

All of the inventive examples can be adjusted to the required viscosity range for coating, and achieve higher flop values than comparative examples VB1 and VB6. The inventive examples are therefore more suitable than the comparative examples for improving the effect pigment orientation of basecoat materials.

Test System 2: Storage Stability of an Effect Pigment Basecoat Material

The effect pigment slurry and the basecoat material are prepared in accordance with the formulation specified in tables 7 and 8. Thereafter in each case 100 g of the basecoat material are weighed out into a 350 ml PE beaker and the respective rheology additive is incorporated with stirring using the Dispermat LV from Getzmann (5 min, 800 rpm, 5 cm paddle stirrer).

The rheology additives are used in an added amount of 1.5% active substance in order to achieve a minimum viscosity of 600 mPas (spindle 3 at 50 rpm, Brookfield LV DV-I viscometer from Brookfield) for coating. If the minimum viscosity is not achieved, the amount of the respective additive added is increased in line with the recommended amount in the technical datasheet. The basecoat materials are subsequently stored at RT overnight and then adjusted to a spray viscosity of 600-800 mPas with the Brookfield LV DV-I viscometer from Brookfield (spindle 3 at 50 rpm) by addition of DI water. The basecoat material is dispensed into 100 ml glass tubes and stored at RT for 4 weeks. The storage stability of the effect pigment basecoat material is assessed by measuring the syneresis in percent in comparison to the total volume. The lower the value for the syneresis, the better the storage stability of the coating material and therefore the better the rheology activity of the rheology additive in question.

TABLE 7

Effect pigment slurry

| | |
|---|---|
| Butyl glycol | 47.9 g |
| DISPERBYK-180 | 1.5 g |

TABLE 7-continued

Effect pigment slurry

| | |
|---|---|
| Dispermat LV, 10 min, 800 rpm, 5 cm paddle stirrer | |
| Hydrolan IL 2154 | 50.6 g |
| Total | 100.0 g |

TABLE 8

Effect pigment basecoat material

| | |
|---|---|
| Daotan VTW 6462 | 47.6 g |
| DI water | 14.6 g |
| Isobutanol | 2.3 g |
| BYK-011 | 0.1 g |
| BYK-347 | 0.3 g |
| DMEA (10% in water) | 1.7 g |
| Effect pigment slurry | 13.8 g |
| DI water | 19.6 g |
| Total | 100.0 g |

Addition of the individual components with stirring, with further stirring for 10 minutes after addition of the last component, Dispermat LV, 5 cm paddle stirrer, 800 rpm

TABLE 9

Results

| Product | Amount added of active substance [%] | Syneresis [%] |
|---|---|---|
| Blank sample | — | 90 |
| VB4 | 0.8** | 38 |
| VB6 | 4* | 85 |
| B1 | 2.4* | 19 |
| B2 | 1.5 | 28 |
| B3 | 1.5 | 0 |
| B4 | 1.5 | 24 |
| B7 | 2.3* | 16 |
| B10 | 1.8* | 0 |

*the amount had to be increased in order to achieve the required minimum viscosity of 600 mPas.
**the amount could not be increased further beyond the maximum amount figure in the datasheet, owing to the excessively low active substance content In table 9 it can be seen that the products according to the invention lead to less syneresis by the effect pigment basecoat material, relative to the comparative examples. The inventive examples are therefore better suited than the comparative examples to improving the storage stability of the effect pigment basecoat material.

Test System 3: Holdout in a 2K PU White Paint

The white paint is produced in accordance with the formulation specified in table 10. Thereafter in each case 50 g of the white paint are weighed out into a 175 ml PE beaker and the respective rheology additive is incorporated with stirring using the Dispermat LV, with an added amount of 0.5% active substance (based on total paint) (5 min, 1000 rpm, 2.5 cm toothed disk). Comparative example VB3 requires incorporation during the production of the paint (for formula see table 10 in conjunction with table 11). The samples are then left to stand at RT for 1 day, after which the holdout test is conducted, as a measure of the rheology activity under application conditions.

For this purpose, the curing agent solution is incorporated in the specified mixing ratio into the respective paint sample for 1 minute, with a spatula, and is then applied. Application takes place using a graduated doctor blade (model 421/I) from Erichsen at a wet film thickness of 30-300 μm using an automatic drawdown bench from BYK-Gardner with a speed of 5 cm/s onto BYK-Gardner contrast cards No. 2801. After application, the contrast cards are suspended directly horizontally for drying. After drying has taken place, a determination is made of the film thickness in μm (wet) at which the paint does not sag, meaning that no runs or ridging can be seen. The higher the value for the holdout when using the same active substance, the better the rheology activity of the additive. Besides the activity, the compatibility of the rheology additive also plays an important part in its suitability. The compatibility is evaluated by measuring the gloss at 20° using a Mikro-Trigloss from BYK-Gardner at a wet film thickness of 90 μm after overnight drying.

The higher the gloss, the better the compatibility of the rheology additive in question. Only if a rheology additive improves the holdout without reducing the gloss relative to the blank sample is it suitable for use.

TABLE 10

2K PU white paint

| Component A: | Blank sample and other examples | AQ610 intermediate as per table 11* |
|---|---|---|
| Bayhydrol A 145 | 48.0 g | 48.0 g |
| BYK-011 | 1.6 g | 1.6 g |
| DMEA (10% form) | 4.2 g | 4.2 g |
| Disperbyk-194 | 2.1 g | 2.1 g |
| DI water | 18.4 g | — |
| AQ-610 intermediate (3% form) | — | 20.9 g |
| Tronox RKB-4 | 25.3 g | 25.3 g |
| Dispermat CV, 30 min, 8500 rpm, 18 m/s, 1 mm glass beads (millbase:beads ratio = 1:1) | | |
| BYK-345 | 0.3 g | 0.3 g |
| BYK-333 | 0.1 g | 0.1 g |
| Total | 100.0 g | 102.5 g |
| Bayhydur 304 | 20.5 g | 20.5 g |
| MPA | 4.5 g | 4.5 g |
| Total | 25.0 g | 25.0 g |
| Mixing ratio A:B | 40:10 | 41:10 |

*datasheet for comparison product (AQ610) requires prior production as an intermediate before use in the paint, owing to the presentation form.

TABLE 11

Intermediate AQ-610

| | |
|---|---|
| DI water | 80.0 g |
| Dispermat CV, 20 min, 2000 rpm, 2.5 cm toothed disk | |
| VB3 | 20.0 g |
| Total | 100.0 g |

TABLE 12

Results

| Product | Holdout [μm] | 20° Gloss |
|---|---|---|
| Blank sample | 90 | 50 |
| VB2 | 90 | 69 |
| VB3 | 210 | 9 |
| VB5 | 120 | 65 |
| VB6 | 150 | 67 |
| B1 | 180 | 60 |
| B2 | 180 | 65 |
| B3 | 350 | 55 |
| B4 | 180 | 65 |
| B7 | 180 | 51 |
| B12 | 180 | 62 |
| B14 | 180 | 64 |
| B15 | 180 | 64 |

In table 12 it can be seen that relative to the blank sample, the inventive products on the one hand exhibit significantly improved holdout and on the other hand do not impair the gloss. In comparison to the inventive products, it is found that the comparative products only achieve either good holdout or good gloss, but not both properties in combination, as is possible with the inventive products.

Test System 4: Holdout in an Acrylate Styrene Copolymer Clearcoat

The clearcoat material is produced in accordance with the formulation specified in table 13. Thereafter in each case 50 g of the clearcoat material are weighed out into a 175 ml PE beaker and the respective rheology additive is incorporated with stirring using the Dispermat LV, with an added amount of 0.5% active substance (based on total paint) (5 min, 1000 rpm, 2.5 cm toothed disk). The samples are then left to stand at RT for 1 day, after which the holdout test is conducted, as a measure of the rheology activity under application conditions.

For this purpose the sample is applied with a stepped doctor blade (model 421/I) from Erichsen at a wet film thickness of 30-300 µm using an automatic drawdown bench from BYK-Gardner with a speed of 5 cm/s onto BYK-Gardner contrast cards No. 2801. After application, the contrast cards are suspended directly horizontally for drying. After drying has taken place, a determination is made of the film thickness in µm (wet) at which the paint does not sag, meaning that no runs or ridging can be seen. The higher the value for the holdout when using the same active substance, the better the rheology activity.

TABLE 13

Clearcoat based on acrylate-styrene copolymer

| | |
|---|---|
| Neocryl XK-205 | 75.0 g |
| Butyl glycol | 10.0 g |
| DI water | 13.4 g |
| BYK-024 | 0.5 g |
| BYK-346 | 1.0 g |
| AMP-90 | 0.1 g* |
| Dispermat LV, 5 min, 1000 rpm, 4 cm toothed disk | |
| Total | 100.0 g |

Preparation of the clearcoat material with stirring
*adjustment of the pH with AMP-90 to pH 8.2-8.5

TABLE 14

Results

| Product | Holdout [µm] | Visual evaluation |
|---|---|---|
| Blank sample | 30 | satisfactory |
| VB4 | 180 | gel particles |
| VB6 | 60 | satisfactory |
| VB8 | 90 | satisfactory |
| VB9 | 120 | satisfactory |
| VB10 | 200 | nibs |
| B2 | 300 | satisfactory |
| B3 | 350 | satisfactory |
| B4 | 300 | satisfactory |
| B14 | 300 | satisfactory |
| B17 | 210 | satisfactory |
| B18 | 180 | satisfactory |
| B19 | 210 | satisfactory |
| B20 | 240 | satisfactory |
| B21 | 250 | satisfactory |

In table 14 it can be seen that the inventive products, relative to the comparative examples, lead to a much better holdout without any visual impairment. Comparative example VB4, while having a holdout comparable with that of example B9, nevertheless has adverse visual consequences in the dry coating film, since it shows gel particles. The processing properties or compatibility of comparative example VB4 are therefore poorer than those of the inventive examples. VB10 and B21 differ critically in the fact that, in contrast to B21, VB10 does not carry a COOH end group, being instead capped with tall oil fatty acid. In comparison to B21, VB10 possesses a lower holdout and an unacceptable appearance because of the formation of nibs.

Test System 5: Storage Stability of a Yellow Iron Oxide Pigment Concentrate

The pigment concentrate is prepared according to the formulation specified in table 15. Thereafter in each case 50 g of the pigment concentrate are weighed out into a 175 ml PE beaker and the respective rheology additive is incorporated with stirring using the Dispermat LV in an added amount of 0.5% active substance (based on total) (5 min, 1000 rpm, 2.5 cm toothed disk). Only the intermediate from VB3 had to be incorporated into the millbase, owing to the low active substance content. The pigment concentrates are subsequently dispensed into 50 ml tubes with snap-on lids, and are stored at 40° C. for 6 weeks. The storage stability of the pigment concentrate is assessed by measurement of the syneresis in percent in comparison to the total volume, and by visual assessment of the sediment by means of a metal spatula. The lower the value for the syneresis and for the sediment, the better the storage stability of the pigment concentrate and therefore the better the rheology activity of the rheology additive in question.

TABLE 15

Yellow iron oxide pigment concentrate formulation

| Component: | Blank sample and other examples | AQ610 intermediate as per table 11* |
|---|---|---|
| DI water | 23.6 g | 9.0 g |
| Acticide MBS | 0.1 g | 0.1 g |
| BYK-1730 | 0.5 g | 0.5 g |
| DISPERBYK-194 | 12.5 g | 12.5 g |
| AQ-610 intermediate | — | 16.6 g |
| Bayferrox 3920 | 50.0 g | 50.0 g |
| Dispermat CV, 20 min, 8500 rpm, 4 cm toothed disk, 40° C. | | |
| DI water | 13.3 | 13.3 g |
| Total | 100.0 g | 102.0 g |

TABLE 16

Results

| Sample | Syneresis/% | Sediment, visual* |
|---|---|---|
| Blank sample | 45 | 4 |
| VB1 | 38 | 3 |
| VB3 | 40 | 3 |
| VB4 | 35 | 3 |
| B3 | 30 | 2 |
| B11 | 28 | 2 |
| B12 | 32 | 2-3 |
| B13 | 26 | 2 |
| B14 | 30 | 2 |

*sediment: 1: none/2: little/3: moderate/4: severe/5: very severe

From table 16 it can be seen that the inventive products, relative to the blank sample and to the comparative examples, lead to relatively low syneresis and relatively low sediment. The inventive examples are therefore better suited than the comparative examples to improving the storage stability of the yellow iron oxide pigment concentrate.

Test System 6: Antisettling in an Aqueous Basecoat

The effect pigment slurry and the basecoat material are prepared according to the formulation specified in tables 17 and 18. Thereafter in each case 50 g of the basecoat material are weighed out into a 100 ml glass bottle and stored at RT for 4 days.

The settling behavior of the effect pigment basecoat material is assessed by measurement of the syneresis in percent in comparison with the total volume.

The lower the value for the syneresis, the better the antisettling properties and therefore the better the rheology activity of the rheology additive in question.

TABLE 17

| Effect pigment slurry | |
| --- | --- |
| Butyl glycol | 47.9 g |
| DISPERBYK-180 | 1.5 g |
| Dispermat LV, 10 min, 800 rpm, 5 cm paddle stirrer | |
| Hydrolan IL 2154 | 50.6 g |
| Total | 100.0 g |

TABLE 18

| Effect pigment basecoat material | |
| --- | --- |
| Daotan VTW 6462 | 44.7 g |
| DI water | 13.7 g |
| Isobutanol | 2.2 g |
| BYK-011 | 0.1 g |
| BYK-347 | 0.3 g |
| DMEA (10% in water) | 1.6 g |
| Effect pigment slurry | 13.0 g |
| Rheology additive 25% form | 4.0 g |
| DI water | 20.4 g |
| Total | 100.0 g |

Addition of the individual components with stirring, stirring continued for 10 minutes after addition of the last component, Dispermat LV, 5 cm paddle stirrer, 800 rpm

TABLE 19

| Results | |
| --- | --- |
| Product | Syneresis [%] |
| Blank sample | 91 |
| B17 | 35 |
| B21 | 57 |
| VB10 | 64 |

From table 19 it can be seen that the inventive examples lead more effectively to lower syneresis than the respective comparative examples.

The inventive examples are therefore better suited than the comparative examples to preventing settlement in the basecoat material.

The invention claimed is:

1. A urea- and/or urethane-substituted amide of the general formula (I)

(I)

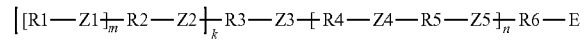

wherein
the radicals R1 independently of one another are selected from the group consisting of
hydrogen, if m=1 and Z1 is a covalent bond, and
radicals $R^a$—[O—(C=O)$_u R^b$]$_v$, in which
$R^a$ is selected from the group consisting of saturated or unsaturated, linear or branched, aliphatic hydrocarbon radicals having 1 to 40 carbon atoms;
aromatic hydrocarbon radicals having 6 to 40 carbon atoms; and
araliphatic hydrocarbon radicals having 7 to 40 carbon atoms;
u is 0 or 1,
v is 0 to 50,
the radicals $R^b$ independently of one another are divalent organic radicals which,
if u=0, are linear or branched alkylene radicals having 2 to 24 carbon atoms, wherein, if an alkylene radical contains two carbon atoms, said radical may carry a substituent having the formula $CH_2$—O—(C=O)$_w R^c$, in which w is 0 or 1 and $R^c$ is an organic radical having 2 to 24 carbon atoms; and the radicals $R^b$,
if u=1, are linear or branched alkylene radicals having 3 to 8 carbon atoms; and
in the radicals [O—(C=O)$_u R^b$] the value for u in each radical independently is 0 or 1;
the radicals R2 independently of one another are divalent organic radicals which are selected from the group consisting of hydrocarbon radicals having 6 to 40 carbon atoms, which optionally contain one or more isocyanurate groups;
the radicals R3 independently of one another are (k+1)-valent organic radicals which are selected from the group consisting of saturated or unsaturated, linear or branched, aliphatic hydrocarbon radicals having 2 to 40 carbon atoms, which optionally contain one or more ether oxygen atoms and/or carry one or more hydroxyl groups;
aromatic hydrocarbon radicals having 6 to 40 carbon atoms, wherein the aromatic hydrocarbon radicals optionally carry one or more linear or branched alkyl substituents having 1 to 10 carbon atoms; and
araliphatic hydrocarbon radicals having 8 to 40 carbon atoms, wherein the aromatic hydrocarbon radicals optionally carry one or more linear or branched alkyl substituents having 1 to 10 carbon atoms; and
a radical N—R2-Z1-R1, if Z2 is an NH—(C=O) group, and wherein N in Z2 and Z3 is bonded to the respective carbon atom in NH—(C=O), and m=k=1,
the radicals R4 independently of one another are divalent organic radicals which are selected from the group consisting of saturated or unsaturated, linear or branched aliphatic hydrocarbon radicals having 2 to 40 carbon atoms, wherein these are optionally substituted by one or more hydroxyl groups;
the radicals R5 independently of one another are divalent organic radicals which are selected from the group consisting of
saturated or unsaturated, linear or branched, aliphatic hydrocarbon radicals having 2 to 40 carbon atoms, wherein the hydrocarbon radicals optionally contain ether oxygen atoms and/or tertiary amino groups;
araliphatic hydrocarbon radicals having 8 to 40 carbon atoms; and aromatic hydrocarbon radicals having 6 to 40 carbon atoms;
the radicals R6 are selected from the group consisting of the aromatic radicals having 6 to 40 carbon atoms and saturated or unsaturated, linear or branched aliphatic hydrocarbon radicals having 4-40 carbons atoms, wherein these are optionally substituted by one or more hydroxyl groups;
the radicals E independently of one another are COOH or COO$^\ominus$Z$^\oplus$, wherein Z$^\oplus$ is selected from the group consisting of alkali metal cations, alkaline earth metal cations, NH$_4{}^\oplus$, heterocyclic cations, and mono- to tetra-organically substituted ammonium ions,
wherein when Z$^\oplus$ is an alkaline earth metal cation, Z$^\oplus$ is ½ Z$^{2\oplus}$,
the radicals Z1 independently of one another are a urethane group, a urea group or a covalent bond;
the radicals Z2 independently of one another are a urethane group or a urea group, or, if R3 is a radical N—R2-Z1-R1, Z2 is an NH—(C=O) group;
the radicals Z3 are an amide group;
the radicals Z4 are an amide group;
the radicals Z5 independently of one another are an amide group or are an amino group, wherein the amino group may also be in protonated or quaternized form and wherein Z$^\oplus$ in that case is absent;
m is 1 to 5;
n is 1 to 12; and
k is 1 to 5.

2. The urea- and/or urethane-substituted amides as claimed in claim 1, in which at least one of the radicals R1, R2, R3, R4, R5, R6, and E is defined as follows:
R1 is selected from the group consisting of
(i) linear or branched alkyl or alkenyl radicals having 6 to 24 carbon atoms and
(ii) polyether radicals of the formula R$^a$—[O—R$^b$]$_v$, in which R$^a$ is a linear or branched alkyl or alkenyl radical having 1 to 18 carbon atoms, R$^b$ is one or more radicals from the group consisting of C$_2$H$_4$, C$_3$H$_6$ and C$_4$H$_8$ and v is an integer from 1 to 25;
R2 is selected from the group consisting of

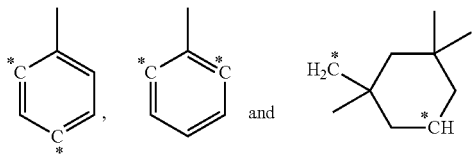

wherein m is 1, Z1 is —O—(C=O)—NH— and Z2 is —NH—(C=O)—O—, and the symbols "*" mark the bonding sites of the respective radical R2 to the radicals Z1 and Z2;
R3 is selected from the group consisting of
(i) alkylene radicals having 2 to 6 carbon atoms, wherein k is the number 1, and
(ii) alkylene radicals having 4 to 6 carbon atoms;
R4 is selected from the group consisting of linear or branched alkylene or alkenylene radicals having 4 to 40 carbon atoms;
R5 is selected from the group consisting of linear or branched alkylene radicals having 2 to 13 carbon atoms, cycloalkylene radicals having 3 to 13 carbon atoms, and arylalkylene radicals having 7 to 13 carbon atoms;
R6 is selected from the group consisting of linear or branched alkylene or alkenylene radicals having 4 to 40 carbon atoms; and
E is a COOH group.

3. The urea- and/or urethane-substituted amides as claimed in claim 1, in which all radicals R1, R2, R3, R4, R5, R6, and E are defined as follows:
R1 is selected from the group consisting of
(i) linear or branched alkyl or alkenyl radicals having 6 to 24 carbon atoms and
(ii) polyether radicals of the formula R$^a$—[O—R$^b$]$_v$, in which R$^a$ is a linear or branched alkyl or alkenyl radical having 1 to 18 carbon atoms, R$^b$ is one or more radicals from the group consisting of C$_2$H$_4$, C$_3$H$_6$ and C$_4$H$_8$ and v is an integer from 1 to 25;
R2 is selected from the group consisting of

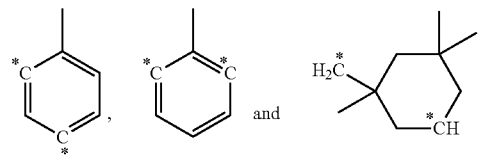

wherein m is 1, Z1 is —O—(C=O)—NH— and Z2 is —NH—(C=O)—O—, and the symbols "*" mark the bonding sites of the respective radical R2 to the radicals Z1 and Z2;
R3 is selected from the group consisting of
(i) alkylene radicals having 2 to 6 carbon atoms, wherein k is the number 1, and
(ii) alkylene radicals having 4 to 6 carbon atoms;
R4 is selected from the group consisting of linear or branched alkylene or alkenylene radicals having 4 to 40 carbon atoms;
R5 is selected from the group consisting of linear or branched alkylene radicals having 2 to 13 carbon atoms, cycloalkylene radicals having 3 to 13 carbon atoms, and arylalkylene radicals having 7 to 13 carbon atoms;
R6 is selected from the group consisting of linear or branched alkylene or alkenylene radicals having 4 to 40 carbon atoms; and
E is a COOH group.

4. A method for producing a rheology control agent, comprising
(A1) one or more species of the formula (III)

R1-X—H         (III)

in which X is O or N(R7), wherein R7 is H, an alkyl radical having 1 to 12 carbon atoms, an aryl radical having 6 to 12 carbon atoms or an alkylaryl radical having 7 to 12 carbon atoms,
are reacted with
with one or more species of the general formula (IV)

R2(NCO)$_{m+1}$         (IV);

or
(A2) one or more diisocyanates containing a uretdione group are reacted with one or more species of the general formula (III)

R1-X—H         (III)

whose radicals are defined as under (A1),
with retention of the uretdione function and reaction of both isocyanate groups to give corresponding uretdione-functional urethanes and/or uretdione-functional ureas;
(B1) one or more species of the general formula (VI)

$$Y\text{—}(O\text{=}C)\text{—}R4\text{-}(C\text{=}O)\text{—}Y' \qquad (VI)$$

wherein Y and Y' independently of one another are $OR^e$ or halide, or Y and Y' are connected to one another and together as Y—Y' are an oxygen atom, and wherein $R^e$ is hydrogen or is $R^d$, wherein $R^d$ is a protecting group for a carboxyl group, are reacted with one or more diamines of the general formula (VII)

$$H_2N\text{—}R5\text{-}NH_2 \qquad (VII)$$

optionally in the presence of one or more species of the general formula (VIII)

$$(HX)_k\text{—}R3\text{-}NH(R8) \qquad (VIII)$$

wherein X is defined as in formula (III) and in which R8 is H,
an alkyl radical having 1 to 12 carbon atoms, which optionally contains one or more ether oxygen atoms and/or carries one or more hydroxyl groups,
an aryl radical having 6 to 12 carbon atoms,
an alkylaryl radical having 7 to 12 carbon atoms, or
a radical —R3'[-Z2-R2-[Z1-R1]$_{m'}$]$_{k'}$,
and, when a terminal radical —R5-NH2 is formed, this radical is reacted
(a) with one or more species of the general formula (VIa)

$$Y\text{—}(O\text{=}C)\text{—}R6\text{-}E' \qquad (VIa)$$

in which E' is E or $COOR^d$ and, if E' is (C=O)—Y', Y and Y' are defined as in formula (VI),
or
(b) with one or more species of the general formula (X)

$$H_2C\text{=}C(R^f)\text{-}E' \qquad (X)$$

wherein $R^f$ is hydrogen or an alkyl radical having 1 or 2 carbon atoms,
in a stoichiometric ratio such that the resulting building block (B1) containing amide groups contains exactly one end group E';
or
(B2) one or more amino carboxylic acids of the general formulae (IXa) and/or (IXb)

$$HOOC\text{—}R4\text{-}NH_2 \qquad (IXa)$$

and/or $$HOOC\text{—}R5\text{-}NH_2 \qquad (IXb)$$

are reacted in a polycondensation reaction in the presence of one or more species of the general formula (VIII)

$$(HX)_k\text{—}R3\text{-}NH(R8) \qquad (VIII),$$

wherein X is defined as in formula (III) and in which R8 is H,
an alkyl radical having 1 to 12 carbon atoms, which optionally contains one or more ether oxygen atoms and/or carries one or more hydroxyl groups,
an aryl radical having 6 to 12 carbon atoms,
an alkylaryl radical having 7 to 12 carbon atoms, or
a radical —R3'[-Z2-R2-[Z1-R1]$_{m'}$]$_{k'}$,
and the species thus obtained are reacted in turn
(a) with one or more species of the general formula (VIa)

$$Y\text{—}(O\text{=}C)\text{—}R6\text{-}E' \qquad (VIa)$$

in which E' is E or $COOR^d$ and, if E' is (C=O)—Y', Y and Y' are defined as in formula (VI),
or
(b) with one or more species of the general formula (X)

$$H_2C\text{=}C(R^f)\text{-}E' \qquad (X)$$

wherein $R^f$ is hydrogen or an alkyl radical having 1 or 2 carbon atoms,
in a stoichiometric ratio such that the resulting building block (B2) containing amide groups contains exactly one end group E';
or
(B3) one or more lactams of the general formulae (XIa) and/or (XIb)

(XIa)

and/or

(XIb)

wherein at least one radical R7 is hydrogen are reacted by ring-opening polymerization
(a) in the presence of one or more species of the general formula (XII)

$$(HO)_k\text{—}R3\text{-}COOH \qquad (XII)$$

or
(b) in the presence of one or more species of the general formula $$(HX)_k\text{—}R3\text{-}NH(R8) \qquad (VIII),$$

in which
R8 is H,
an alkyl radical having 1 to 12 carbon atoms, which optionally contains one or more ether oxygen atoms and/or carries one or more hydroxyl groups,
an aryl radical having 6 to 12 carbon atoms,
an alkylaryl radical having 7 to 12 carbon atoms, or
a radical —R3'[-Z2-R2-[Z1-R1]$_{m'}$]$_{k'}$,
wherein, in the case (b), the species thus obtained are reacted in turn
(c) with one or more species of the general formula (VIa)

$$Y\text{—}(O\text{=}C)\text{—}R6\text{-}E' \qquad (VIa)$$

in which E' is E or $COOR^d$ and, if E' is (C=O)—Y', Y and Y' are defined as in formula (VI),
or
(d) with one or more species of the general formula (X)

$$H_2C\text{=}C(R^f)\text{-}E' \qquad (X)$$

wherein $R^f$ is hydrogen or an alkyl radical having 1 or 2 carbon atoms,
in a stoichiometric ratio such that the resultant building block (B2) containing amide groups contains exactly one end group E';
and wherein subsequently
one or more species resulting from (A1) and/or (A2) are reacted with one or more species resulting from (B1), (B2) and/or (B3), and, if E' is COOR$^d$, the protective group R$^d$ is eliminated, wherein E' is converted optionally by salt formation into E,
wherein
R1 is selected from the group consisting of
hydrogen, if m=1 and Z1 is a covalent bond, and
radicals R$^a$—[O—(C=O)$_u$R$^b$]$_v$, in which
R$^a$ is selected from the group consisting of saturated or unsaturated, linear or branched, aliphatic hydrocarbon radicals having 1 to 40 carbon atoms;
aromatic hydrocarbon radicals having 6 to 40 carbon atoms; and
araliphatic hydrocarbon radicals having 7 to 40 carbon atoms;
u is 0 or 1,
v is 0 to 50,
the radicals Rh independently of one another are divalent organic radicals which,
if u=0, are linear or branched alkylene radicals having 2 to 24 carbon atoms, wherein, if an alkylene radical contains two carbon atoms, said radical may carry a substituent having the formula CH$_2$—O—(C=O)$_w$R$^c$, in which w is 0 or 1 and R$^c$ is an organic radical having 2 to 24 carbon atoms; and the radicals R$^b$,
if u=1, are linear or branched alkylene radicals having 3 to 8 carbon atoms; and
in the radicals [O—(C=O)$_u$R$^b$] the value for u in each radical independently is 0 or 1;
R2 is a divalent organic radical selected from the group consisting of hydrocarbon radicals having 6 to 40 carbon atoms, which optionally contain one or more isocyanurate groups;
R3 is a (k+1)-valent organic radical selected from the group consisting of saturated or unsaturated, linear or branched, aliphatic hydrocarbon radicals having 2 to 40 carbon atoms, which optionally contain one or more ether oxygen atoms and/or carry one or more hydroxyl groups;
aromatic hydrocarbon radicals having 6 to 40 carbon atoms, wherein the aromatic hydrocarbon radicals optionally carry one or more linear or branched alkyl substituents having 1 to 10 carbon atoms; and
araliphatic hydrocarbon radicals having 8 to 40 carbon atoms, wherein the aromatic hydrocarbon radicals optionally carry one or more linear or branched alkyl substituents having 1 to 10 carbon atoms; and
a radical N—R2-Z1-R1, if Z2 is an NH—(C=O) group, and wherein N in Z2 and Z3 is bonded to the respective carbon atom in NH—(C=O), and m=k=1;
R3' is a (k'+1)-valent organic radical selected from the group consisting of saturated or unsaturated, linear or branched, aliphatic hydrocarbon radicals having 2 to 40 carbon atoms, which optionally contain one or more ether oxygen atoms and/or carry one or more hydroxyl groups;
aromatic hydrocarbon radicals having 6 to 40 carbon atoms, wherein the aromatic hydrocarbon radicals optionally carry one or more linear or branched alkyl substituents having 1 to 10 carbon atoms; and
araliphatic hydrocarbon radicals having 8 to 40 carbon atoms, wherein the aromatic hydrocarbon radicals optionally carry one or more linear or branched alkyl substituents having 1 to 10 carbon atoms; and
a radical N—R2-Z1-R1, if Z2 is an NH—(C=O) group, and wherein N in Z2 and Z3 is bonded to the respective carbon atom in NH—(C=O);

R4 is a divalent organic radical selected from the group consisting of saturated or unsaturated, linear or branched aliphatic hydrocarbon radicals having 2 to 40 carbon atoms, wherein these are optionally substituted by one or more hydroxyl groups;
R5 independently is a divalent organic radical selected from the group consisting of saturated or unsaturated, linear or branched, aliphatic hydrocarbon radicals having 2 to 40 carbon atoms, wherein the hydrocarbon radicals optionally contain ether oxygen atoms and/or tertiary amino groups;
araliphatic hydrocarbon radicals having 8 to 40 carbon atoms; and
aromatic hydrocarbon radicals having 6 to 40 carbon atoms;
R6 is selected from the group consisting of the aromatic radicals having 6 to 40 carbon atoms and saturated or unsaturated, linear or branched aliphatic hydrocarbon radicals having 4-40 carbons atoms, wherein these are optionally substituted by one or more hydroxyl groups;
E is COOH or COO$^\ominus$Z$^\oplus$, wherein Z$^\oplus$ is selected from the group consisting of alkali metal cations, alkaline earth metal cations, NH$_4$$^\oplus$, heterocyclic cations, and mono- to tetra-organically substituted ammonium ions, wherein when Z$^\oplus$ is an alkaline earth metal cation, Z$^\oplus$ is ½ Z$^{2+}$,
Z1 is a urethane group, a urea group or a covalent bond;
Z2 is a urethane group or a urea group, or, if R3 is a radical N—R2-Z1-R1, Z2 is an NH—(C=O) group;
Z3 is an amide group;
m is 1 to 5;
m' is 1 to 5;
k is 1 to 4;
k' is 1 to 4; and
k+k' is 2 to 5; wherein the rheology control agent produced according to the method comprises a urea- and/or urethane-substituted amide of the general formula (I)

(I)
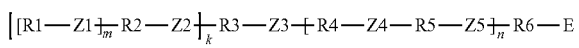

wherein
the radicals R1 independently of one another are selected from the group consisting of
hydrogen, if m=1 and Z1 is a covalent bond, and
radicals R$^a$—[O—(C=O)$_u$R$^b$]$_v$, in which
R$^a$ is selected from the group consisting of saturated or unsaturated, linear or branched, aliphatic hydrocarbon radicals having 1 to 40 carbon atoms;
aromatic hydrocarbon radicals having 6 to 40 carbon atoms; and
araliphatic hydrocarbon radicals having 7 to 40 carbon atoms;
u is 0 or 1,
v is 0 to 50,
the radicals R$^b$ independently of one another are divalent organic radicals which,
if u=0, are linear or branched alkylene radicals having 2 to 24 carbon atoms, wherein, if an alkylene radical contains two carbon atoms, said radical may carry a substituent having the formula CH$_2$—O—(C=O)$_w$R$^c$, in which w is 0 or 1 and R$^c$ is an organic radical having 2 to 24 carbon atoms; and the radicals R$^b$,
if u=1, are linear or branched alkylene radicals having 3 to 8 carbon atoms; and
in the radicals [O—(C═O)$_u$R$^b$] the value for u in each radical independently is 0 or 1;
the radicals R2 independently of one another are divalent organic radicals which are selected from the group consisting of hydrocarbon radicals having 6 to 40 carbon atoms, which optionally contain one or more isocyanurate groups;
the radicals R3 independently of one another are (k+1)-valent organic radicals which are selected from the group consisting of saturated or unsaturated, linear or branched, aliphatic hydrocarbon radicals having 2 to 40 carbon atoms, which optionally contain one or more ether oxygen atoms and/or carry one or more hydroxyl groups;
aromatic hydrocarbon radicals having 6 to 40 carbon atoms, wherein the aromatic hydrocarbon radicals optionally carry one or more linear or branched alkyl substituents having 1 to 10 carbon atoms; and
araliphatic hydrocarbon radicals having 8 to 40 carbon atoms, wherein the aromatic hydrocarbon radicals optionally carry one or more linear or branched alkyl substituents having 1 to 10 carbon atoms; and
a radical N—R2-Z1-R1, if Z2 is an NH—(C═O) group, and wherein N in Z2 and Z3 is bonded to the respective carbon atom in NH—(C═O), and m=k=1;
the radicals R4 independently of one another are divalent organic radicals which are selected from the group consisting of
saturated or unsaturated, linear or branched aliphatic hydrocarbon radicals having 2 to 40 carbon atoms, wherein these are optionally substituted by one or more hydroxyl groups;
the radicals R5 independently of one another are divalent organic radicals which are selected from the group consisting of
saturated or unsaturated, linear or branched, aliphatic hydrocarbon radicals having 2 to 40 carbon atoms, wherein the hydrocarbon radicals optionally contain ether oxygen atoms and/or tertiary amino groups;
araliphatic hydrocarbon radicals having 8 to 40 carbon atoms; and
aromatic hydrocarbon radicals having 6 to 40 carbon atoms;
the radicals R6 are selected from the group consisting of the aromatic radicals having 6 to 40 carbon atoms and saturated or unsaturated, linear or branched aliphatic hydrocarbon radicals having 4-40 carbons atoms, wherein these are optionally substituted by one or more hydroxyl groups;
the radicals E independently of one another are COOH or COO$^\ominus$Z$^\oplus$, wherein Z$^\oplus$ is selected from the group consisting of alkali metal cations, alkaline earth metal cations, NH$_4$$^\oplus$, heterocyclic cations, and mono- to tetra-organically substituted ammonium ions,
wherein when Z$^\oplus$ is an alkaline earth metal cation, Z$^\oplus$ is ½ Z$^{2\oplus}$,
the radicals Z1 independently of one another are a urethane group, a urea group or a covalent bond;
the radicals Z2 independently of one another are a urethane group or a urea group, or, if R3 is a radical N—R2-Z1-R1, Z2 is an NH—(C═O) group;
the radicals Z3 are an amide group;
the radicals Z4 are an amide group;
the radicals Z5 independently of one another are an amide group or are an amino group, wherein the amino group may also be in protonated or quaternized form and wherein Z$^\oplus$ in that case is absent;
m is 1 to 5;
n is 1 to 12; and
k is 1 to 5.

5. A liquid composition comprising one or more urea- and/or urethane-substituted amides as claimed in claim 1.

6. The liquid composition as claimed in claim 5, further comprising one or more polar, aprotic solvents.

7. The liquid composition as claimed in claim 5, wherein the composition is a rheology control agent composition.

8. The liquid composition as claimed in claim 6, wherein it comprises as solvent one or more of N-alkylbutyrolactam, dialkyl sulfoxide, and carboxamide.

9. A rheology control agent composition comprising
(i) 5 to 70 wt % of one or more urea- and/or urethane-substituted amides as claimed in claim 1,
(ii) 30 to 95 wt % of one or more solvents, and
(iii) 0 to 4 wt % of one or more ionogenic compounds.

10. The rheology control agent composition as claimed in claim 9, comprising
(i) 10 to 60 wt % of the one or more urea- and/or urethane-substituted amides,
(ii) 40 to 90 wt % of one or more polar, aprotic, organic solvents, and
(iii) 0 to 3 wt % of one or more ionogenic compounds selected from the group of the halides, pseudohalides, formates, acetates, and nitrates.

11. The liquid composition as claimed in claim 5, wherein the liquid composition comprises 0.1 to 7 wt % of the one or more urea- and/or urethane-substituted amides.

12. The urea- and/or urethane-substituted amides as claimed in claim 1, wherein the radicals [O—(C═O)$_u$R$^b$] for which u=0 are arranged in one or more blocks.

13. The urea- and/or urethane-substituted amides as claimed in claim 1, wherein the radicals [O—(C═O)$_u$R$^b$] for which u=1 are arranged in one or more blocks.

14. The urea- and/or urethane-substituted amides as claimed in claim 1, wherein the radicals E independently of one another are COOH or COO$^\ominus$Z$^\oplus$, wherein Z$^\oplus$ is selected from the group consisting of alkali metal cations, NH$_4$$^\oplus$, heterocyclic cations, mono- to tetra-organically substituted ammonium ions whose organic substituents are selected from the group of alkyl radicals having 1 to 24 carbon atoms, aryl radicals having 6 to 24 carbon atoms, alkylaryl radicals having 7 to 25 carbon atoms, wherein the alkyl radicals, aryl radicals, and alkylaryl radicals optionally carry one or more hydroxyl groups, and alkaline earth metal cations, or wherein Z$^\oplus$ is absent if Z5 is a protonated or quaternized amino group.

15. The urea- and/or urethane-substituted amides as claimed in claim 2, wherein the (ii) alkylene radicals having 4 to 6 carbon atoms are substituted by hydroxyl groups, wherein k is the number 1, 2 or 3.

* * * * *